US009494260B2

(12) United States Patent
Luo et al.

(10) Patent No.: US 9,494,260 B2
(45) Date of Patent: Nov. 15, 2016

(54) DYNAMICALLY VULCANIZED POLYARYLENE SULFIDE COMPOSITION

(71) Applicant: Ticona LLC, Florence, KY (US)

(72) Inventors: Rong Luo, Florence, KY (US); Joseph J. Grenci, Florence, KY (US); Christopher McGrady, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 192 days.

(21) Appl. No.: 13/804,675

(22) Filed: Mar. 14, 2013

(65) Prior Publication Data

US 2013/0273290 A1 Oct. 17, 2013

Related U.S. Application Data

(60) Provisional application No. 61/623,618, filed on Apr. 13, 2012, provisional application No. 61/665,423, filed on Jun. 28, 2012, provisional application No. 61/678,370, filed on Aug. 1, 2012, provisional (Continued)

(51) Int. Cl.
*C08L 81/04* (2006.01)
*F16L 9/133* (2006.01)
(Continued)

(52) U.S. Cl.
CPC ............... *F16L 9/133* (2013.01); *C08L 81/02* (2013.01); *C08L 81/04* (2013.01); *F16L 9/147* (2013.01);
(Continued)

(58) Field of Classification Search
CPC ......... C08L 81/02; C08L 81/04; F16L 11/00; F16L 9/133; F16L 9/147; F27B 14/00; Y10T 428/1352; Y10T 428/1397; Y10T 428/2958
USPC ..................... 428/35.7, 36.92, 389; 523/400; 525/189, 537
See application file for complete search history.

(56) References Cited

U.S. PATENT DOCUMENTS 3,354,129 A 11/1967 Edmonds, Jr. et al.
3,919,177 A 11/1975 Campbell
(Continued)

FOREIGN PATENT DOCUMENTS

CA 2032370 6/1991
EP 0900650 3/1999
(Continued)

OTHER PUBLICATIONS

International Search Report and Written Opinion for PCT/US2013/036333 dated Apr. 23, 2014, 10 pages.
(Continued)

*Primary Examiner* — Yan Lan
(74) *Attorney, Agent, or Firm* — Dority & Manning, P.A.

(57) ABSTRACT

Polyarylene sulfide compositions are described that exhibit high strength and flexibility. Methods for forming the polyarylene sulfide compositions are also described. Formation methods include dynamic vulcanization of a polyarylene sulfide composition that includes an impact modifier dispersed throughout the polyarylene sulfide. A crosslinking agent is combined with the other components of the composition following dispersal of the impact modifier throughout the composition. The crosslinking agent reacts with the impact modifier to form crosslinks within and among the polymer chains of the impact modifier. The compositions can exhibit excellent physical characteristics at extreme temperatures and can be used to form, e.g., tubular member such as pipes and hoses and fibers.

20 Claims, 20 Drawing Sheets

Related U.S. Application Data application No. 61/703,331, filed on Sep. 20, 2012, provisional application No. 61/707,314, filed on Sep. 28, 2012, provisional application No. 61/717,899, filed on Oct. 24, 2012, provisional application No. 61/739,926, filed on Dec. 20, 2012.

(51) Int. Cl.

| | |
|---|---|
| *F16L 9/147* | (2006.01) |
| *C08L 81/02* | (2006.01) |
| *F16L 11/00* | (2006.01) |
| *F27B 14/00* | (2006.01) |
| *F16L 57/04* | (2006.01) |
| *F16L 57/06* | (2006.01) |
| *F16L 58/04* | (2006.01) |

(52) U.S. Cl.
CPC ............... *F16L 11/00* (2013.01); *F16L 57/04* (2013.01); *F16L 57/06* (2013.01); *F16L 58/04* (2013.01); *F27B 14/00* (2013.01); *Y10T 428/1352* (2015.01); *Y10T 428/1393* (2015.01); *Y10T 428/1397* (2015.01); *Y10T 428/2958* (2015.01)

(56) References Cited

U.S. PATENT DOCUMENTS

| | | | |
|---|---|---|---|
| 4,337,329 A | 6/1982 | Kubo et al. | |
| 4,368,321 A | 1/1983 | Sherk et al. | |
| 4,371,671 A | 2/1983 | Anderson | |
| 4,384,081 A | 5/1983 | Kubo et al. | |
| 4,452,951 A | 6/1984 | Kubo et al. | |
| 4,464,515 A | 8/1984 | Rempel et al. | |
| 4,503,196 A | 3/1985 | Rempel et al. | |
| 4,581,417 A | 4/1986 | Buding et al. | |
| 2,418,255 A | 8/1987 | Chacko et al. | |
| 4,689,365 A | 8/1987 | Chacko et al. | |
| 4,814,430 A | 3/1989 | Iwasaki et al. | |
| 4,889,893 A | 12/1989 | Kobayashi et al. | |
| 5,006,605 A | 4/1991 | Mizuno et al. | |
| 5,047,465 A | 9/1991 | Auerbach | |
| 5,087,666 A | 2/1992 | Yu et al. | |
| 5,149,731 A | 9/1992 | Uota et al. | |
| 5,240,973 A | 8/1993 | Katoh et al. | |
| 5,240,988 A | 8/1993 | Kohler et al. | |
| 5,248,730 A | 9/1993 | Yamao | |
| 5,270,305 A | 12/1993 | Palmer | |
| 5,380,783 A | 1/1995 | Satake et al. | |
| 5,397,839 A | 3/1995 | Patel | |
| 5,504,141 A | 4/1996 | Collard et al. | |
| 5,578,679 A | 11/1996 | Suzuki et al. | |
| 5,589,544 A | 12/1996 | Horrion | |
| 5,625,002 A | 4/1997 | Kadoi et al. | |
| 5,652,287 A | 7/1997 | Sullivan | |
| 5,654,358 A | 8/1997 | Kadoi et al. | |
| 5,654,383 A | 8/1997 | Köhler et al. | |
| 5,668,214 A | 9/1997 | Suzuki | |
| 5,817,723 A | 10/1998 | Flexman, Jr. et al. | |
| 5,830,965 A | 11/1998 | Imaizumi et al. | |
| 5,837,758 A | 11/1998 | Brown et al. | |
| 5,840,830 A | 11/1998 | Miyahara et al. | |
| 6,001,934 A * | 12/1999 | Yamanaka et al. | 525/383 |
| 6,015,858 A | 1/2000 | Gornowicz | |
| 6,020,431 A | 2/2000 | Venkataswamy et al. | |
| 6,117,950 A | 9/2000 | Yamao et al. | |
| 6,225,416 B1 | 5/2001 | Reil et al. | |
| 6,281,286 B1 | 8/2001 | Chorvath et al. | |
| 6,362,287 B1 | 3/2002 | Chorvath et al. | |
| 6,417,293 B1 | 7/2002 | Chorvath et al. | |
| 6,538,071 B1 | 3/2003 | Fuchs | |
| 6,569,955 B1 | 5/2003 | Brewer et al. | |
| 6,569,958 B1 | 5/2003 | Gross et al. | |
| 6,608,136 B1 | 8/2003 | Dean et al. | |
| 6,649,704 B2 | 11/2003 | Brewer et al. | |
| 6,653,437 B2 | 11/2003 | Hinokimori et al. | |
| 6,657,014 B1 | 12/2003 | Mori et al. | |
| 6,699,946 B1 * | 3/2004 | Lambla et al. | 525/537 |
| 6,713,569 B2 | 3/2004 | Chorvath et al. | |
| 6,740,707 B2 | 5/2004 | Ono et al. | |
| 6,740,709 B2 | 5/2004 | Ono et al. | |
| 6,743,868 B2 | 6/2004 | Fournier et al. | |
| 6,849,697 B2 | 2/2005 | Lambla et al. | |
| 6,875,517 B2 | 4/2005 | Bosshammer et al. | |
| 6,888,719 B1 | 5/2005 | Janzen et al. | |
| 7,011,114 B2 | 3/2006 | Suzuki et al. | |
| 7,041,741 B2 | 5/2006 | Patel et al. | |
| 7,086,420 B2 | 8/2006 | Kahn et al. | |
| 7,208,207 B2 | 4/2007 | Ono et al. | |
| 7,442,744 B2 | 10/2008 | Tokushige et al. | |
| 7,960,473 B2 | 6/2011 | Kobayashi et al. | |
| 7,981,981 B2 | 7/2011 | Ajbani et al. | |
| 2005/0089688 A1 | 4/2005 | Mungioli et al. | |
| 2005/0171303 A1 | 8/2005 | Martin et al. | |
| 2005/0208248 A1 | 9/2005 | Ilo et al. | |
| 2006/0229417 A1 | 10/2006 | Ferrate et al. | |
| 2009/0061134 A1 * | 3/2009 | Ajbani et al. | 428/36.4 |
| 2010/0004375 A1 | 1/2010 | Lalgudi et al. | |
| 2010/0048777 A1 | 2/2010 | Kodama et al. | |
| 2011/0287201 A1 | 11/2011 | Abe et al. | |
| 2012/0037397 A1 | 2/2012 | Mhetar | |
| 2013/0059976 A1 | 3/2013 | Matsuo et al. | |

FOREIGN PATENT DOCUMENTS

| | | |
|---|---|---|
| EP | 2 239 135 A1 | 10/2010 |
| EP | 2418255 | 2/2012 |
| FR | 2617176 | 12/1988 |
| GB | 1558491 | 1/1980 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 2007-169550 A | 7/2007 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | WO 91/18055 | 11/1991 |
| WO | WO 94/16018 | 7/1994 |

OTHER PUBLICATIONS

Abstract of Chinese Patent No. CN1049508, Feb. 27, 1991, 1 page.
Chinese Search Report dated Nov. 30, 2015, 2 pages.

* cited by examiner

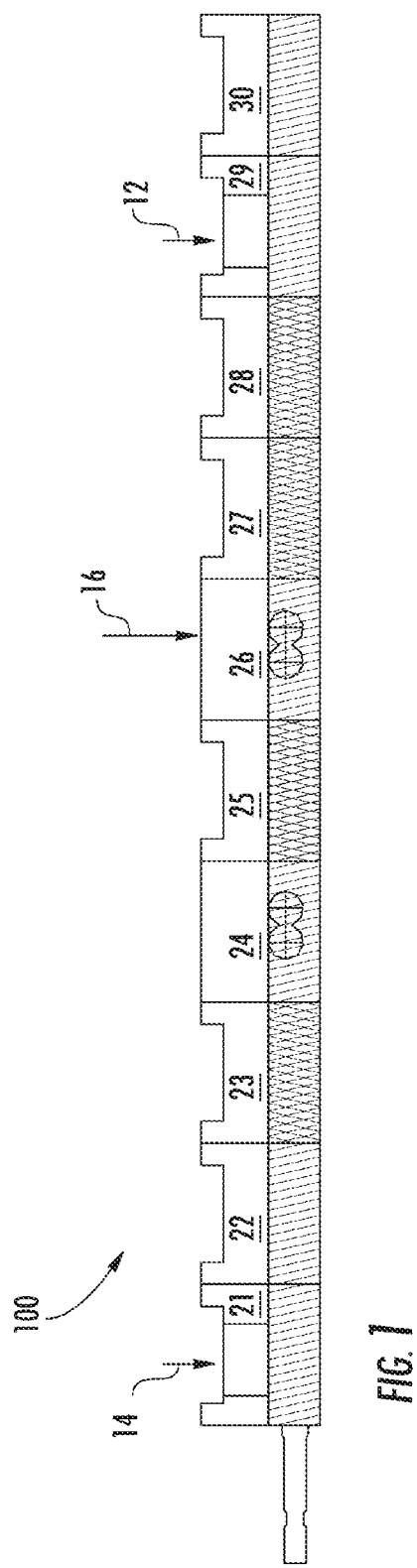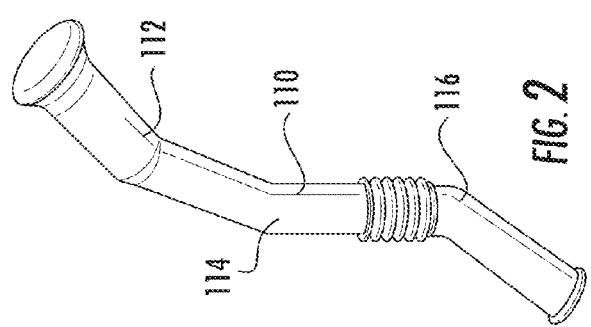

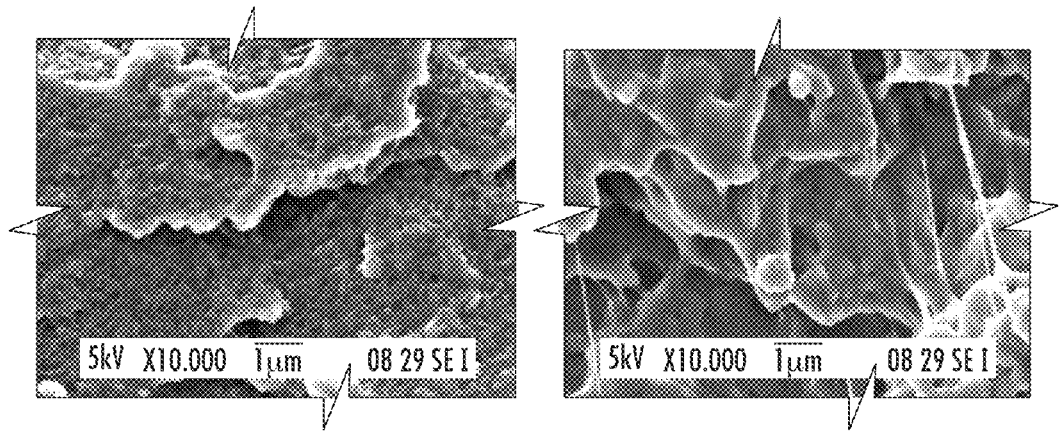
FIG. 22A (SAMPLE 3)    FIG. 22B (SAMPLE 6)
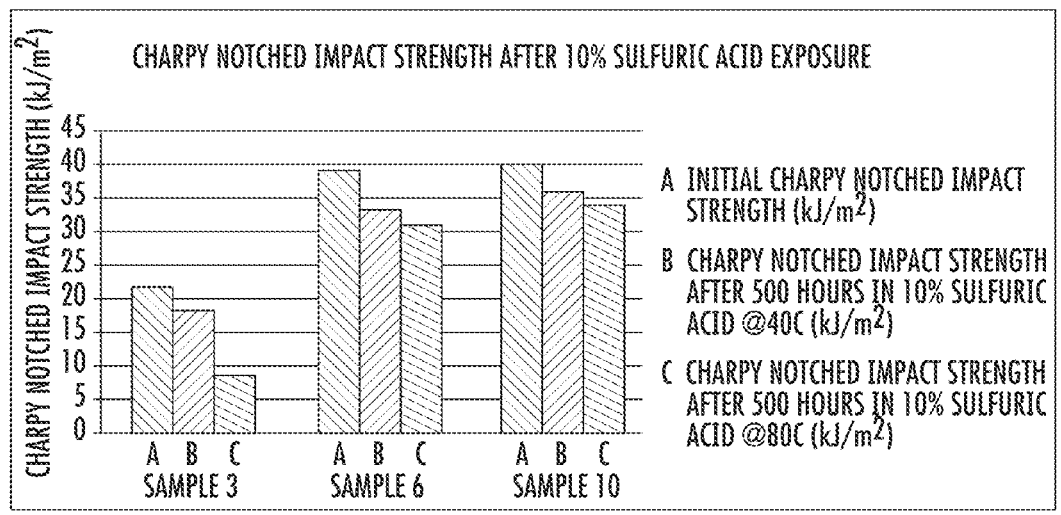
FIG. 23

DYNAMICALLY VULCANIZED POLYARYLENE SULFIDE COMPOSITION

CROSS REFERENCE TO RELATED APPLICATIONS

The present application claims filing benefit of U.S. Provisional Patent application 61/623,618 having a filing date of Apr. 13, 2012; U.S. Provisional Patent application 61/665,423 having a filing date of Jun. 28, 2012; U.S. Provisional Patent application 61/678,370 having a filing date of Aug. 1, 2012; U.S. Provisional Patent application 61/703,331 having a filing date of Sep. 20, 2012; U.S. Provisional Patent application 61/707,314 having a filing date of Sep. 28, 2012; U.S. Provisional Patent application 61/717,899 having a filing date of Oct. 24, 2012; and U.S. Provisional Patent application 61/739,926 having a filing date of Dec. 20, 2012; all of which are incorporated herein by reference in their entirety.

BACKGROUND OF THE INVENTION

Polymer blends that exhibit flexibility in addition to high strength and resistance properties are of significant commercial interest. Such blends have been formed in the past by uniformly mixing an elastic component with a thermoplastic polyolefin such that the elastomer is intimately and uniformly dispersed as a discrete or co-continuous phase within a continuous phase of the polyolefin. Vulcanization of the composite crosslinks the components and provides improved temperature and chemical resistance to the composition. When vulcanization is carried out during combination of the various polymeric components it is termed dynamic vulcanization.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of a polyarylene sulfide composition. Compositions including blends of polyarylene sulfides with impact modifying polymers have been considered for high performance, high temperature applications.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still fail to provide product performance as desired, particularly in applications that require both high heat resistance and high impact resistance.

What are needed in the art are polyarylene sulfide compositions that exhibit high strength characteristics as well as resistance to degradation, even in extreme temperature environments, while maintaining desirable processing characteristics.

SUMMARY OF THE INVENTION

Disclosed in one embodiment is a polyarylene sulfide composition that includes a polyarylene sulfide and a crosslinked impact modifier. The polyarylene sulfide composition exhibits high toughness and good flexibility. For instance, the polyarylene sulfide composition can exhibit a notched Charpy impact strength of greater than about 3 $kJ/m^2$ as measured according to ISO Test No. 179-1 at a temperature of 23° C. and a notched Charpy impact strength of greater than about 8 $kJ/m^2$ as measured according to ISO Test No. 179-1 at a temperature of −30° C.

Also disclosed is a method for forming a polyarylene sulfide composition. A method can include feeding polyarylene sulfide, an impact modifier, and a cross linking agent to a melt processing unit. More specifically, the cross linking agent can be fed to the processing unit following combination of the impact modifier and the polyarylene sulfide and following distribution of the impact modifier throughout the polyarylene sulfide.

Also disclosed are products that can beneficially incorporate the polyarylene sulfide composition including, without limitation, fibers and fibrous products and tubular members, including both single layer and multi-layer tubular members. Tubular members can encompass pipes and hoses suitable for carrying water, oil, gas, fuel, etc., for instance as may be utilized in an automotive system. Other products as may incorporate the polyarylene sulfide composition include sheathed cables and wires and a variety of electrical components. Products can be particularly well suited for use in extreme temperatures and/or in applications in which temperatures may vary over a wide margin.

BRIEF DESCRIPTION OF THE FIGURES

The present disclosure may be better understood with reference to the following figures:

FIG. 1 is a schematic representation of a process for forming the polyarylene sulfide composition as disclosed herein.

FIG. 2 is a single layer tubular member as may be formed from the polyarylene sulfide composition.

FIG. 22 is a scanning electron microscope image of a polyarylene sulfide composition as described herein (FIG. 22B) and a comparison polyarylene sulfide (FIG. 22A).

FIG. 23 compares the effect of sulfuric acid exposure on strength characteristics of polyarylene sulfide compositions as described herein and a comparison composition.

DETAILED DESCRIPTION

Figure 3:
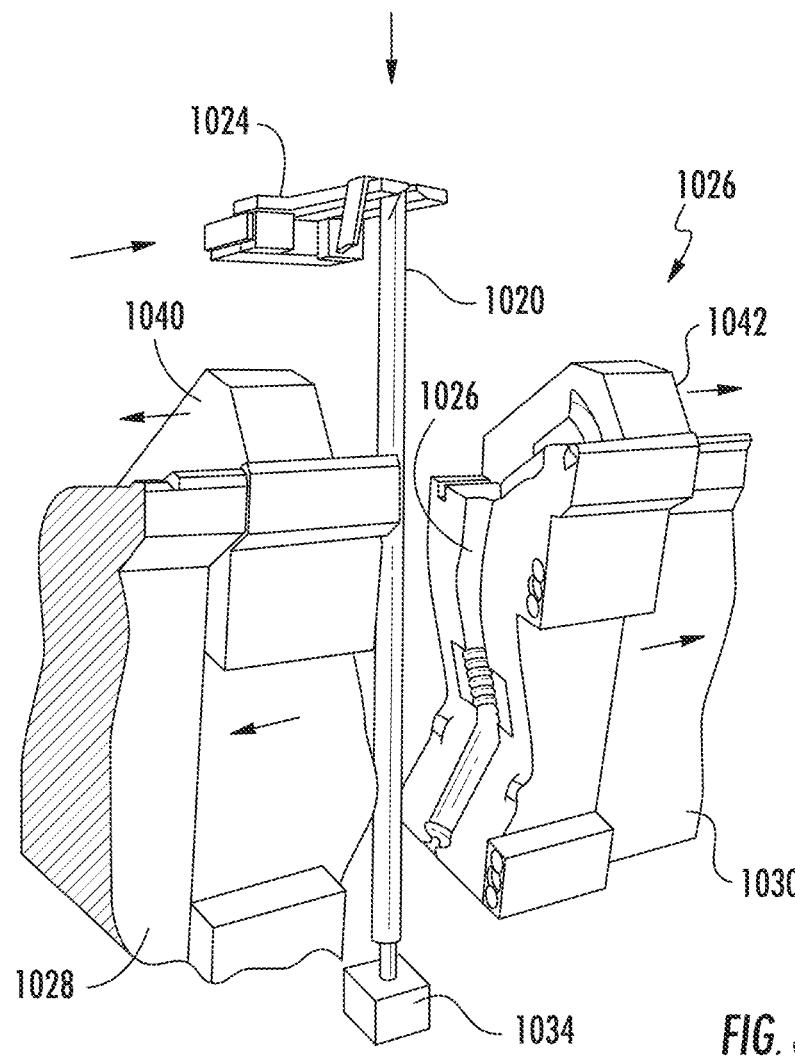
FIG. 3 illustrates a blow molding process as may be used in forming a component that includes the polyarylene sulfide composition.

It is to be understood by one of ordinary skill in the art that the present discussion is a description of exemplary embodiments only, and is not intended as limiting the broader aspects of the present disclosure.

The present disclosure is generally directed to polyarylene sulfide compositions that exhibit excellent strength and flexibility characteristics as well as resistance to chemical degradation due to contact with, e.g., water, oils, gas, synthetic or natural chemicals, etc. Beneficially, the polyarylene sulfide composition can maintain good physical characteristics even when utilized in extreme temperature applications such as high temperatures as may be encountered in automotive applications and low temperatures as may be encountered in piping applications. The polyarylene sulfide can also maintain good physical characteristics under conditions in which the materials are subjected to extreme temperature fluctuations.

The polyarylene sulfide compositions can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent to the polyarylene sulfide composition following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processability that can be utilized to form a product that can exhibit excellent resistance to degradation under a variety of conditions.

According to one embodiment, a formation process can include functionalization of the polyarylene sulfide. This embodiment can provide additional sites for bonding between the impact modifier and the polyarylene sulfide, which can further improve distribution of the impact modifier throughout the polyarylene sulfide and further prevent phase separation. Moreover, functionalization of the polyarylene sulfide can include scission of the polyarylene sulfide chain, which can decrease the melt viscosity of the composition and improve processability. This can also provide a polyarylene sulfide composition that is a low halogen, e.g., low chlorine composition that exhibits excellent physical characteristics and high resistance to degradation.

To provide further improvements to the polyarylene sulfide composition, the composition can be formed to include other conventional additives such as fillers, lubricants, colorants, etc. according to standard practice.

The high strength and flexibility characteristics of the polyarylene sulfide composition can be evident by examination of the tensile, flexural, and/or impact properties of the materials. For example, the polyarylene sulfide composition can have a notched Charpy impact strength of greater than about 3 kJ/m$^2$, greater than about 3.5 kJ/m$^2$, greater than about 5 kJ/m$^2$, greater than about 10 kJ/m$^2$, greater than about 15 kJ/m$^2$, greater than about 30 kJ/m$^2$, greater than about 33 kJ/m$^2$, greater than about 40 kJ/m$^2$, greater than about 45 kJ/m$^2$, or greater than about 50 kJ/m$^2$ as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the polyarylene sulfide composition can maintain good physical characteristics even at extreme temperatures, including both high and low temperatures. For instance, the polyarylene sulfide composition can have a notched Charpy impact strength of greater than about 8 kJ/m$^2$, greater than about 9 kJ/m$^2$, greater than about 10 kJ/m$^2$, greater than about 14 kJ/m$^2$, greater than about 15 kJ/m$^2$, greater than about 18 kJ/m$^2$, or greater than about 20 kJ/m$^2$ as determined according to ISO Test No. 179-1 at −30° C.; and can have a notched Charpy impact strength of greater than about 8 kJ/m$^2$, greater than about 9 kJ/m$^2$, greater than about 10 kJ/m$^2$, greater than about 11 kJ/m$^2$, greater than about 12 kJ/m$^2$, or greater than about 15 kJ/m$^2$ as determined according to ISO Test No. 179-1 at −40° C.

Moreover, the effect of temperature change on the polyarylene sulfide composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the polyarylene sulfide composition also increases, as expected, but the rate of increase of the impact strength is very high, particularly as compared to a composition that does not include the dynamically crosslinked impact modifier. Accordingly, the polyarylene sulfide composition can exhibit excellent strength characteristics at a wide range of temperatures.

The polyarylene sulfide composition can exhibit very good tensile characteristics. For example, the polyarylene sulfide composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The polyarylene sulfide composition may have a tensile strength at break of greater than about 30 MPa, greater than about 35 MPa, greater than about 40 MPa, greater than about 45 MPa, or greater than about 70 MPa.

In addition, the polyarylene sulfide composition can have a relatively low tensile modulus. For instance, the polyarylene sulfide composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The polyarylene sulfide composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The polyarylene sulfide composition can also be utilized continuously at high temperature, for instance at a continuous use temperature of up to about 150° C., about 160° C., or about 165° C. without loss of tensile strength. For example, the polyarylene sulfide composition can maintain greater than about 95%, for instance about 100% of the original tensile strength after 1000 hours of heat aging at 135° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The polyarylene sulfide composition may have a flexural strength at break of greater than about 30 MPa, greater than about 35 MPa, greater than about 40 MPa, greater than about 45 MPa, or greater than about 70 MPa.

The deflection temperature under load of the polyarylene sulfide composition can be relatively high. For example, the deflection temperature under load of the polyarylene sulfide composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The polyarylene sulfide composition can also exhibit excellent stability during long term exposure to harsh environmental conditions. For instance, under long term exposure to an acidic environment, the polyarylene sulfide composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the polyarylene sulfide composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the polyarylene sulfide composition can maintain about 80% or more of the initial Charpy notched impact strength. The polyarylene sulfide composition can also maintain desirable strength characteristics following exposure to other potentially degrading materials, such as salts, e.g., road salts as may be encountered in automotive applications.

Permeation resistance can be important for a wide variety of applications for the polyarylene sulfide composition, for instance when utilizing the composition in formation of fuel lines, storage tanks, or the like. The polyarylene sulfide composition can exhibit excellent permeation resistance to a wide variety of materials. For instance, a shaped product formed of the polyarylene sulfide composition can exhibit a permeation resistance to a fuel or a fuel source (e.g., gasoline, diesel fuel, jet fuel, unrefined or refined oil, etc.) of less than about 10 g-mm/m$^2$-day, less than about 5 g-mm/m$^2$-day, less than about 3 g-mm/m$^2$-day, or less than about 2 g-mm/m$^2$-day. By way of example, the polyarylene sulfide composition (or a product formed of the polyarylene sulfide composition) can exhibit a permeation resistance to an ethanol blend of ethanol/iso-octane/toluene at a weight ratio of 10:45:45 at 40° C. of less than about 10 g-mm/m$^2$-day, less than about 3 g-mm/m$^2$-day, less than about 2.5 g-mm/m$^2$-day, less than about 1 g-mm/m$^2$-day, or less than about 0.1 g-mm/m$^2$-day. The permeation resistance to a blend of 15 wt. % methanol and 85 wt. % oxygenated fuel (CM15A) at 40° C. can be less than about 5 g-mm/m$^2$-day, less than about 3 g-mm/m$^2$-day, less than about 2.5 g-mm/m$^2$-day, less than about 1 g-mm/m$^2$-day, less than about 0.5 g-mm/m$^2$-day, less than about 0.3 g-mm/m$^2$-day, or less than about 0.15 g-mm/m$^2$-day. The permeation resistance to methanol at 40° C. can be less than about 1 g-mm/m$^2$-day, less than about 0.5 g-mm/m$^2$-day, less than about 0.25 g-mm/m$^2$-day, less than about 0.1 g-mm/m$^2$-day, or less than about 0.06 g-mm/m$^2$-day. Permeation resistance can be determined according to SAE Testing Method No. J2665. In addition, the polyarylene sulfide composition can maintain original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The polyarylene sulfide composition can also be resistant to uptake of materials, and specifically hydrocarbons. For example, a molded structure formed of the composition can exhibit a volume change of less than about 25%, less than about 20%, or less than about 14% following exposure to the hydrocarbon at a temperature of 130° C. for a period of time of about two weeks.

The polyarylene sulfide composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The polyarylene sulfide composition can also exhibit good processing characteristics, for instance as demonstrated by the melt viscosity of the composition. For instance, the polyarylene sulfide composition can have a melt viscosity of less than about 2800 poise as measured on a capillary rheometer at 316° C. and 400 sec$^{-1}$ with the viscosity measurement taken after five minutes of constant shear. Moreover, the polyarylene sulfide composition can exhibit improved melt stability over time as compared to polyarylene sulfide compositions that do not include crosslinked impact modifiers. Polyarylene sulfide compositions that do not include a crosslinked impact modifier tend to exhibit an increase in melt viscosity over time, and in contrast, disclosed compositions can maintain or even decrease in melt viscosity over time.

The polyarylene sulfide composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the polyarylene sulfide composition. In addition, the polyarylene sulfide composition can exhibit high shear sensitivity, which indicates excellent characteristics for use in formation processes such as blow molding and extrusion processing.

FIG. 1 illustrates a schematic of a process that can be used in forming the polyarylene sulfide composition. As illustrated, the components of the polyarylene sulfide composition may be melt-kneaded in a melt processing unit such as an extruder 100. Extruder 100 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 100 that includes multiple zones or barrels. In the illustrated embodiment, extruder 100 includes 10 barrels numbered 21-30 along the length of the extruder 100, as shown. Each barrel 21-30 can include feed lines 14, 16, vents 12, temperature controls, etc. that can be independently operated. A general purpose screw design can be used to melt process the polyarylene composition. By way of example, a polyarylene sulfide composition may be melt mixed using a twin screw extruder such as a Coperion co-rotating fully intermeshing twin screw extruder.

In forming a polyarylene sulfide composition, the polyarylene sulfide can be fed to the extruder 100 at a main feed throat 14. For instance, the polyarylene sulfide may be fed to the main feed throat 14 at the first barrel 21 by means of a metering feeder. The polyarylene sulfide can be melted and mixed with the other components of the composition as it progresses through the extruder 100. The impact modifier can be added to the composition in conjunction with the polyarylene sulfide composition at the main feed throat 14 or downstream of the main feed throat, as desired.

At a point downstream of the main feed throat 14, and following addition of the impact modifier to the composition, the crosslinking agent can be added to the composition. For instance, in the illustrated embodiment, a second feed line 16 at barrel 26 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

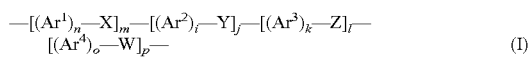

wherein $Ar^1$, $Ar^1$, $Ar^3$, and $Ar^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be synthesized prior to forming the polyarylene sulfide composition, though this is not a requirement of a process. Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

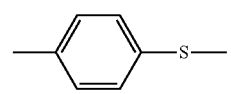

and segments having the structure of formula (III):

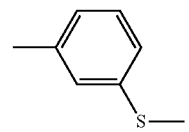

or segments having the structure of formula (IV):

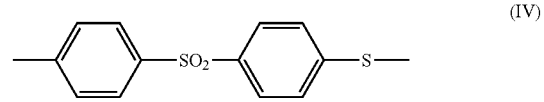

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

As stated, formation of the polyarylene sulfide is not a requirement, and a polyarylene sulfide can also be purchased from known suppliers. For instance Fortron® polyphenylene sulfide available from Ticona of Florence, Ky., USA can be purchased and utilized as the polyarylene sulfide.

The polyarylene sulfide composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the polyarylene sulfide composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of 1200 $s^{-1}$ and at a temperature of 310° C.

According to one embodiment, the polyarylene sulfide can be functionalized to further encourage bond formation between the polyarylene sulfide and the impact modifier. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the polyarylene sulfide composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A polyarylene sulfide composition that exhibits excellent strength and degradation resistance in addition to low halogen content can be advantageous as low halogen content polymeric materials are becoming increasingly desired due to environmental concerns. In one embodiment, the polyarylene sulfide composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

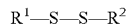

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'-dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α,β unsaturated dicarboxylic acid or salt thereof having from about 3 to about 8 carbon atoms; an α,β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

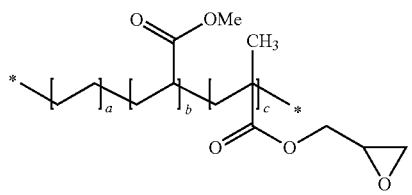

wherein, a, b, and c are 1 or greater.

In another embodiment the impact modifier can be a random copolymer of ethylene, ethyl acrylate and maleic anhydride having the following structure:

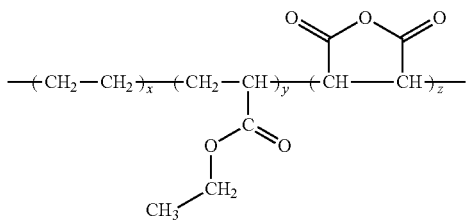

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to about 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 1, the impact modifier can be added to the composition in conjunction with the polyarylene sulfide composition at the main feed throat 14 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the polyarylene composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The polyarylene sulfide composition may generally include the crosslinking agent in an amount from about 0.05 wt. % to about 2 wt. % by weight of the polyarylene sulfide composition, from about 0.07 wt. % to about 1.5 wt. % by weight of the polyarylene sulfide composition, or from about 0.1 wt. % to about 1.3 wt. %.

The crosslinking agent can be added to the melt processing unit following mixing of the polyarylene sulfide and the impact modifier. For instance, as illustrated in FIG. 1, the crosslinking agent can be added to the composition at a downstream location 16 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the L/$L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the polyarylene sulfide composition. One or more fillers may generally be included in the polyarylene sulfide composition an amount of from about 5 wt. % to about 70 wt. %, or from about 20 wt. % to about 65 wt. % by weight of the polyarylene sulfide composition.

The filler can be added to the polyarylene sulfide composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the polyarylene sulfide composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the polyarylene sulfide composition. In general, particulate fillers can encompass any particulate material having a median particle size of less than about 750 µm, for instance less than about 500 µm, or less than about 100 µm. In one embodiment, a particulate filler can have a median particle size in the range of from about 3 µm to about 20 µm. In addition, a particulate filler can be solid or hollow, as is known. Particulate fillers can also include a surface treatment, as is known in the art.

Particulate fillers can encompass one or more mineral fillers. For instance, the polyarylene sulfide composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

A filler can be an electrically conductive filler such as, without limitation, carbon black, graphite, graphene, carbon fiber, carbon nanotubes, a metal powder, and so forth. In those embodiments in which the polyarylene sulfide composition includes electrically conductive fillers, for instance when the polyarylene sulfide composition is utilized in forming a fuel line, adequate electrically conductive filler can be included such that the composition has a volume specific resistance of equal to or less than about $10^9$ ohms cm.

In one embodiment, the polyarylene sulfide composition can include a UV stabilizer as an additive. For instance, the polyarylene sulfide composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a polyarylene sulfide composition is one or more colorants as are generally known in the art. For instance, the polyarylene sulfide composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes.

Pigments that can be incorporated in a polyarylene sulfide composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the polyarylene sulfide composition can encompass, without limitation, antimicrobials, lubricants, pigments or other colorants, impact modifiers, antioxidants, stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the polyarylene sulfide composition in conventional amounts and according to conventional processing techniques, for instance through addition to the polyarylene sulfide composition at the main feed throat. Beneficially, the polyarylene sulfide composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the polyarylene sulfide composition, the composition is thoroughly mixed in the remaining section(s) of the extruder and extruded through a die. The final extrudate can be pelletized or otherwise shaped as desired, for instance the final extrudate can be in the form of a pultruded tape or ribbon.

Conventional shaping processes can be used for forming articles out of the polyarylene sulfide composition including, without limitation, extrusion, injection molding, blow-molding, thermoforming, foaming, compression molding, hot-stamping, fiber spinning and so forth. Shaped articles that may be formed may include structural and non-structural shaped parts, for instance components for automotive engineering thermoplastic assemblies as well as industrial applications such as components of cooling tower pumps, water heaters, and the like. For instance thermoform sheets, foamed substrates, injection molded or blow molded components, and the like can be formed from the polyarylene sulfide composition.

Tubular members as may be utilized for carrying liquids or gases, and in one particular embodiment heated liquids or gases, may be formed from the polyarylene sulfide composition. For instance tubular members including hoses, pipes, conduits and the like can be formed from the polyarylene sulfide composition. The tubular members may be single-layered or multi-layered. Typical conventional extrusion or molding processes may be used for forming the tubular members. For instance, either single or multi-screw extruders may be used for extrusion of the tubing. In another embodiment, a blow molding process may be utilized in forming a tubular hollow member.

Referring to FIG. 2, one embodiment of a tubular member 110 formed from the polyarylene sulfide composition is shown. As shown, the tubular member 110 extends in multiple directions leading to a relatively complex shape. For instance, before the polyarylene sulfide composition can solidify, the angular displacements as shown in FIG. 2 can be formed into the part. The tubular member 110 includes angular displacement changes at 112, 114 and 116. The tubular member 110 may comprise, for instance, a part that may be used in the exhaust system of a vehicle.

A component can include the polyarylene sulfide composition throughout the entire component or only a portion of the component. For instance, when considering a component having a large aspect ratio (L/D>1), such as a fiber or a tubular member, the component can be formed such that the polyarylene sulfide composition extends along a section of the component and an adjacent section can be formed of a different composition, for instance a different polyarylene sulfide composition. Such a component can be formed by, e.g., altering the material that is fed to a molding device during a formation process. The component can include an area in which the two materials are mixed that represents a border region between a first section and a second section formed of different materials. A component can include a single section formed of the polyarylene sulfide composition or a plurality of sections, as desired. Moreover, other sections of a component can be formed of multiple different materials. By way of example, when considering a tubular component such as a fluid conduit, both ends of the tubular component can be formed of the polyarylene sulfide composition and a center section can be formed of a less flexible composition. Thus, the more flexible ends can be utilized to tightly affix the component to other components of a system. Alternatively, a center section of a component could be formed from the polyarylene sulfide composition, which can improve flexibility of the component in that section, making installation of the component easier.

According to one embodiment, the tubular member such as the tubular member 110 illustrated in FIG. 2 can be a single layer tubular member formed according to a blow molding process. FIG. 3 illustrates one method as may be utilized for forming a component from the polyarylene sulfide composition. It should be understood, however, that while the blow molding process illustrates in FIG. 3 includes the formation of a tubular member, blow molding methodology can be utilized in forming a wide variety of shaped devices, and is in no way intended to be limited to tubular components formed of the polyarylene sulfide composition.

During blow molding, the polyarylene sulfide composition is first heated and extruded into a parison 1020 using a die attached to an extrusion device. When the parison 1020 is formed, the composition must have sufficient melt strength to prevent gravity from undesirably elongating portions of the parison 1020 and thereby forming non-uniform wall thicknesses and other imperfections. The parison is received into a molding device 1026, generally formed of multiple sections 1028, 1030, 1040, 1042 that together form a three-dimensional mold cavity 1026. For instance, a robotic arm 1024 can be utilized to manipulate the parison 1020 in the molding device.

As can be appreciated, a certain period of time elapses from formation of the parison 1020 to moving the parison into engagement with the molding device. During this stage of the process, the melt strength of the polyarylene sulfide composition can be high enough such that the parison 1020 maintains its shape during movement. The polyarylene sulfide composition can also be capable of remaining in a semi-fluid state and not solidifying too rapidly before blow molding commences.

Once the molding device is closed, a gas, such as an inert gas is fed into the parison 1020 from a gas supply 1034. The gas supplies sufficient pressure against the interior surface of the parison such that the parison conforms to the shape of the mold cavity. After blow molding, the sections can be opened as indicated by the directional arrows, and the finished shaped article is then removed. In one embodiment, cool air can be injected into the molded part for solidifying the polyarylene sulfide composition prior to removal from the molding device.

Figure 4:
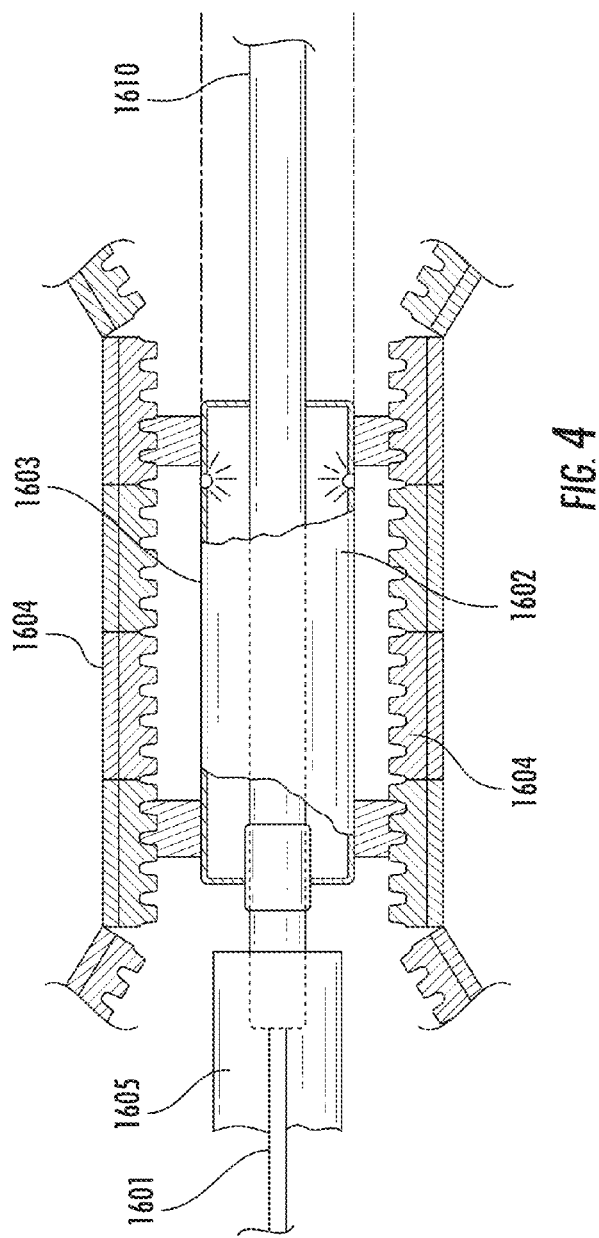
FIG. 4 illustrates a continuous blow molding process as may be used in forming a component that includes the polyarylene sulfide composition.

According to another embodiment illustrated in FIG. 4, a continuous blow molding process can be used to form a component, such as long tubular components as may be useful in piping applications. FIG. 4 presents a schematic illustration of one method as may be utilized in forming a long tubular component according to a continuous blow molding process. In a continuous process, a stationary extruder (not shown) can plasticize and force the molten polyarylene sulfide composition through a head to form a continuous parison 1601. An accumulator 1605 can be used to support the parison 1601 and prevent sagging prior to molding. The parison may be fed to a mold formed of articulated sections 1602, 1603 that travel in conjunction with the continuous parison on a mold conveyor assembly 1604. Air under pressure is applied to the parison to blow mold the composition within the mold. After the composition has been molded and sufficiently cooled within the mold as the mold and composition travel together, the mold segments are separated from one another and the formed section of the component (e.g., the pipe) 1606 is removed from the conveyor and taken up, as on a take-up reel (not shown).

A tubular member such as a pipe or a tube can be formed according to an extrusion process. For example, an extrusion process utilizing a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals, and the like.

When forming a product such as a tubular member according to an extrusion process, the polyarylene sulfide composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens, and so forth. In general, the line speed can be from about 4 meters per minute to about 15 meters per minute. Of course, the actual line speed can depend upon the final dimension of the final product, the aesthetics of the final product and process stability.

The die swell during an extrusion process can generally be negligible. A draw down of about 1.2 to about 1.7 can generally be utilized, as a higher draw down can negatively affect the final properties of the product, depending on other processing conditions. Die drool can generally be avoided by drying the resin adequately prior to extrusion as well as by maintaining the melt temperature at less than about 304° C.

In one embodiment, tubular members extruded from the polyarylene sulfide composition can have a wall thickness of between about 0.5 millimeters to about 5 millimeters, though tubular members having larger wall thickness can be formed from the composition as desired. The calibration ring inner diameter can decide the outer diameter of the tubular member and will generally be less than the outer diameter of the die, as is known. The inner diameter of the tubular member can be utilized to determine the desired outer diameter of the mandrel and the line speed, as is known.

Figure 5:
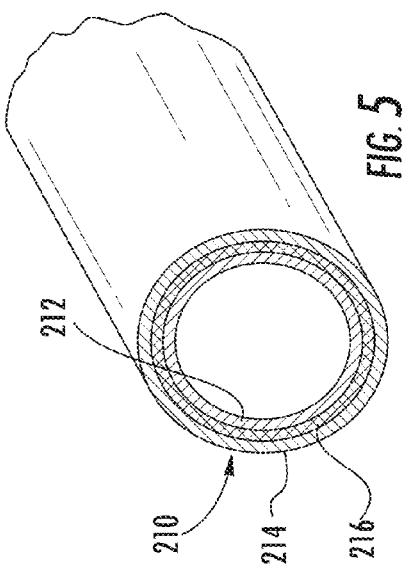
FIG. 5 is a multi-layer tubular member, one or more layers of which may be formed from the polyarylene sulfide composition.

A tubular member that incorporates the polyarylene sulfide composition can be a multi-layered tubular member. FIG. 5 illustrates a multi-layered tubular member 210 as may incorporate the polyarylene sulfide composition in one or more layers of the tubular member. For example, at least the inner layer 212 can include the polyarylene sulfide composition that exhibits high impact strength characteristics under a wide temperature range and which is substantially inert to the materials to be carried within the tubular member 210.

The outer layer 214 and the intermediate layer 216 can include a polyarylene sulfide composition that is the same or different than the polyarylene sulfide composition described herein. Alternatively, other layers of the multilayer tubular member may be formed of different materials. For example, in one embodiment the intermediate layer 216 can exhibit high resistance to pressure and mechanical effects. By way of example, layer 216 can be formed of polyamides from the group of homopolyamides, co-polyamides, their blends or mixtures which each other or with other polymers. Alternatively, layer 216 can be formed of a fiber reinforced material such as a fiber-reinforced resin composite or the like. For example, a polyaramid (e.g., Kevlar®) woven mat can be utilized to form an intermediate layer 216 that is highly resistant to mechanical assaults. An intermediate later can be included such as a spiraled, knitted or braided layer of textile or wire. In a spiral construction, for example, the spiraled layer may comprise two layers, each applied at or near the so-called lock angle or neutral angle of about 54° with respect to the longitudinal axis of the tubular member 210 but with opposite spiral directions. However, the tubular member 210 is not limited to spiral constructions. An intermediate layer 216 may be a knit, braided, wrapped, woven, or non-woven fabric.

Outer layer 214 can provide protection from external assaults as well as provide insulative or other desirable characteristics to the tubular member. For example, a multi-layer hose can include an outer layer 214 formed from an adequate kind of rubber material having high levels of chipping, weather, flame and cold resistance. Examples of such materials include thermoplastic elastomer such as polyamide thermoplastic elastomer, polyester thermoplastic elastomer, polyolefin thermoplastic elastomer, and styrene thermoplastic elastomer. Suitable materials for outer layer 214 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 214 can alternatively be formed of a harder, less flexible material, such as a polyolefin, polyvinylchloride, or a high density polyethylene, a fiber reinforced composite material such as a glass fiber composite or a carbon fiber composite, or a metal material such as a steel jacket.

Of course, a multi-layer tubular member is not limited to three layers, and may include two, four, or more distinct layers. A multi-layer tubular member may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

Multilayer tubular members may be made by conventional processes, such as, for example, co-extrusion, dry lamination, sandwich lamination, coextrusion coating, blow molding, continuous blow molding, and the like. By way of example, in forming a three-layered tubular member 210 as illustrated in FIG. 5, the polyarylene sulfide composition, a polyamide composition, and a thermoplastic elastomer composition can be separately fed into three different extruders. The separate extrusion melts from those three extruders can then be introduced into one die under pressure. While producing three different tubular melt flows, those melt flows can be combined in the die in such a manner that the melt flow of the polyarylene sulfide composition forms the inner layer 212, that of the polyamide composition forms the intermediate layer 216, and that of the thermoplastic elastomer composition forms the outer layer 214, and the thus-combined melt flows are co-extruded out of the die to produce a three-layered tubular member.

Of course, any known tube-forming methods including blow molding methods as described above is employable. For instance, in one embodiment, one or more layers of the multi-layered tubular member can be formed from a continuous tape, e.g., a fiber reinforced tape or ribbon formed according to a pultrusion formation method. A tape can be wrapped to form the tubular member or a layer of a multilayered tubular member according to known practices as are generally known in the art.

Tubular members as may be formed from the polyarylene sulfide composition can include flow lines for oil and gas, for instance as may be utilized in off-shore and on-shore oil and gas fields and transport. Flowlines that incorporate the polyarylene sulfide composition may be single-layered or multi-layered. When considering a multi-layer flowline, the polyarylene sulfide composition can be utilized to form an inner barrier layer of the flowline, but it should be understood that polyarylene sulfide composition layers of a multi-layer flowline are in no way limited to barrier layers and one or more other layers of a multi-layer flowline may incorporate the polyarylene sulfide composition.

Figure 6:
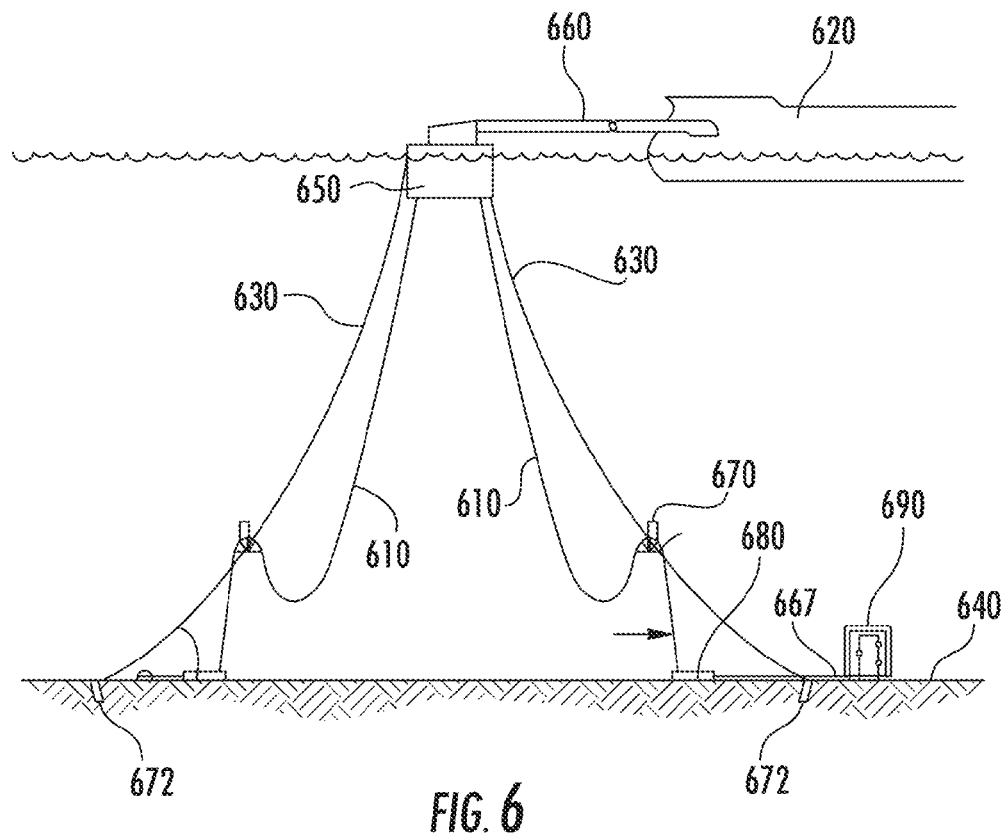
FIG. 6 illustrates an oil and gas system including a flexible riser flowline extending from the sea floor to a surface unit.

The flowlines can be utilized according to known practice in any gas and oil facility as is generally known in the art. By way of example, FIG. 6 illustrates a typical off shore facility including flexible risers 610 for conducting production fluid from a subsea facility to a floating vessel 620. The floating vessel 620 is illustrated floating on a body of water having a floor 640. Flexible risers 610 are provided to convey production fluid from a subsea pipeline end manifold 680 through a catenary moored buoy 650 through a yoke 660 to the floating vessel 620. The catenary moored buoy 650 is anchored by anchor lines 630 to anchors 672 provided at the floor 640. The pipeline end manifold 680 is connected by a plurality of flowlines 667 to wells 690.

Flexible risers as illustrated in FIG. 6 can have any suitable configuration. By way of example, they can be designed bonded or unbounded risers and can have a steep S or lazy S configuration or alternatively a steep wave or lazy wave configuration as are known in the art. Standard buoyancy modules 670 as illustrated in FIG. 6 may be utilized in conjunction with the flexible risers to develop the desired configuration as is known. The riser 610 passes over the buoyancy module 670 that can include, e.g., a cradle and a buoy. The buoyancy module 670 can also be attached to the anchor line 630 so as to support the riser 610 and be held in the desired position as determined by the length of the anchor line 630 and the riser 610.

Figure 7:
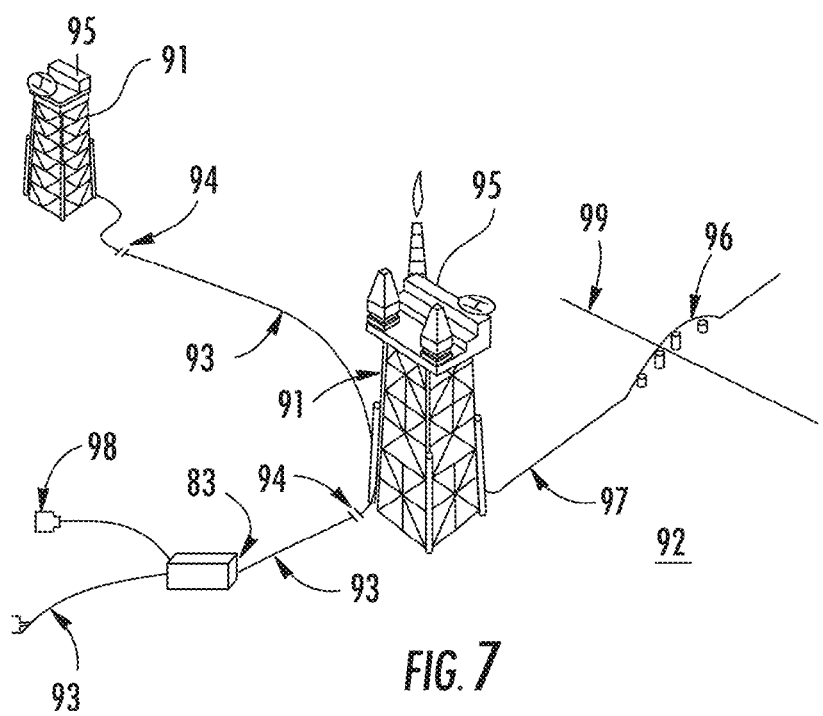
FIG. 7 illustrates an oil and gas production field incorporating multiple different types of flowlines that can include a polyarylene sulfide composition as described herein.

FIG. 7 illustrates a typical field that can incorporate a plurality of different types of flowlines, one or more of which may include at least a barrier layer formed of the polyarylene sulfide composition. As can be seen, the field can include fixed risers 91 that can carry production fluid from the sea floor 92 to a platform 95. The field can include infield flowlines 93 that can carry production fluid, supporting fluids, umbilicals, etc., within the field. In addition, both the risers 91 and the infield flowlines 93 can be bundled lines as discussed above. The system also includes a plurality of tie-ins 94 at which point different flowlines can be merged, for instance to form a bundled riser and/or where individual flowlines may be altered, for instance through expansion. The system also includes a plurality of satellite wells 98 from which the hydrocarbon production fluid is obtained and manifolds. An export pipeline 97 can carry production fluid from the platform 95 to shore, a storage facility, or a transport vessel. The export pipeline 97 may also include one or more crossings 96 to by-pass other flowlines, e.g., another pipeline 99.

Figure 8:
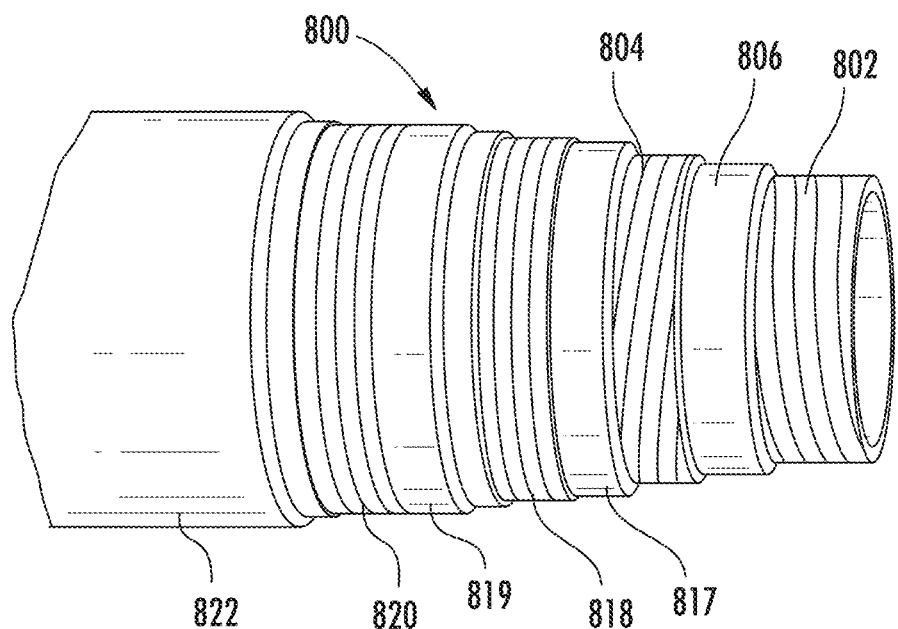
FIG. 8 is a schematic representation of a multilayer riser including a barrier layer formed of the polyarylene sulfide composition as described herein.

Referring to FIG. 8, one embodiment of a flexible riser 800 that can incorporate the polyarylene sulfide composition is illustrated. As shown, the riser 800 has several concentric layers. An innermost layer is generally termed the carcass 802 and can be formed of helically wound stainless steel strip so as to provide resistance against external pressures. The carcass 802 is generally a metal (e.g., stainless steel) tube that supports the adjacent barrier layer 806 and prevents riser collapse due to pressure or loads applied during operation. The bore of the flexible riser 800 can vary depending upon the fluid to be carried by the riser. For instance, the riser 800 can have a smooth bore when intended for use to carry a supporting fluid such as an injection fluid (e.g., water and/or methanol) and can have a rough bore when utilized to carry production fluids (e.g., oil and gas). The carcass, when present, can generally be between about 5 and about 10 millimeters in thickness. According to one embodiment, the carcass can be formed by helically wound stainless steel strips that interlock with one another to form the strong, interconnected carcass.

The barrier layer 806 is immediately adjacent the carcass 802. The barrier layer is formed of the polyarylene sulfide composition and provides strength and flexibility while preventing permeation of the fluid carried by the riser through the riser wall. In addition, the barrier layer 806 formed of the polyarylene sulfide composition can resist degradation by both the fluid carried by the riser (e.g., the production fluid, the injection fluid, etc.) as well as by temperature conditions under which the riser is utilized. The barrier layer 806 can generally be between about 3 and about 10 millimeters in thickness and can be extruded from a melt over the carcass 2.

The riser 800 will also include an outer layer 822 that provides an external sleeve and an external fluid barrier as well as providing protection to the riser from external damage due to, e.g., abrasion or encounters with environmental materials. The outer layer 822 can be formed of a polymeric material such as the polyarylene sulfide composition or a high density polyethylene that can resist both mechanical damage and intrusion of seawater to the inner layers of the riser. According to one embodiment, the outer layer 822 can be a composite material that includes a polymeric material in conjunction with a reinforcement material such as carbon fibers, carbon steel fibers, or glass fibers.

A hoop strength layer 804 can be located external to the barrier layer to increase the ability of the riser to withstand hoop stresses caused by forced applied to the riser wall by a pressure differential. The hoop strength layer can generally be a metal layer formed of, e.g., a helically wound strip of carbon steel that can form a layer of from about 3 to about 7 millimeters in thickness. The hoop strength layer can resist both internal pressure and bending of the riser. In one embodiment, the carbon steel strip that forms the hoop strength layer 804 can define an interlocking profile, for instance an S- or Z-cross-sectional configuration, such that adjacent windings interlock with one another to form a stronger layer. In one embodiment, the hoop strength layer can include multiple materials for added strength. For example, in an embodiment in which design and pressure requirements call for higher burst strengths, a second flat metal strip can be helically wound over the interlocked metal strips of the hoop strength layer to provide additional strength for this layer. An intervening polymeric layer such as an anti-wear layer discussed further herein can optionally be located between the two layers of the hoop strength layer as well.

Additional strength layers 818 and 820 can be formed of helically-wound metal (generally carbon steel) strips. The strength layers 818 and 820 can be separated from the hoop strength layer 804 and from each other by polymeric anti-wear layers 817 and 819. The strength layers 818 and 820 can provide additional hoop strength as well as axial strength to the riser. Though the riser 800 includes two strength layers 818, 820, it should be understood that a riser may include any suitable number of strength layers, including no strength layers, one, two, three, or more strength layers. In general, the helically wound metal strips of strength layers 818 and 820 will overlap but need not interlock. As such, the strength layers 818, 820 may have a width of from about 1 millimeter to about 5 millimeters.

The intervening anti-wear layers 817, 819 can be formed of the polyarylene sulfide composition or alternatively can be formed of other polymers such as a polyamide, a high density polyethylene, or the like. In one embodiment, the anti-wear layers 817, 819 can be a composite material that includes unidirectional fibers, for instance carbon or glass fibers. For instance, the anti-wear layers 817, 819 can be formed of a polymer tape or fiber-reinforced polymer tape such as a pultruded polymer tape or ribbon that is helically wound over each strength layer. The anti-wear layers 817, 819 can prevent wear of the adjacent strength layers that can come about due to motion of the strips forming the layers. The anti-wear layers 817, 819 can also prevent birdcaging of the adjacent layers. As with the strength layers 818, 820 of the riser 800, the number of anti-wear layers is not particularly limited, and a riser can include no anti-wear layers, one anti-wear layers, or multiple anti-wear layers depending upon the depth and local environment in which the riser will be utilized, the fluid to be carried by the riser, and so forth. The anti-wear layers 817, 819, can be relatively thin, for instance between about 0.2 and about 1.5 millimeters.

A riser may include additional layers as are generally known in the art. For example, a riser may include an insulation layer, for instance immediately internal to the outer layer 822. An insulation layer, when present can be formed of a foam, fibrous mat, or any other insulation material as is known. By way of example, single or multiple layers of an insulation tape can be wound onto the outer strength layer to form an insulation layer between the outer strength layer 820 and the outer layer 822.

While the above description is for an unbounded flexible riser, it should be understood that the polyarylene sulfide composition may likewise be utilized in forming a bonded flowline. For example, the polyarylene sulfide composition may be utilized in forming a barrier layer and optionally one or more additional layers of a bonded flowline for use in an offshore oil and gas facility.

Other flowlines for use in an oil and gas facility, for instance jumpers, pipelines, fluid supply lines, etc., can have the same general construction as a riser 800 as illustrated in FIG. 8, or may vary somewhat as to particular layers include in the multilayer flowline. For example, an injection fluid supply line, which supplies injection fluid such as methanol, glycol, and/or water to a well head, need not meet the same performance specifications as a production riser. Accordingly, at least a portion of this flowline need not include all of the various strength-enhancing layers as the riser described above. For instance, flowlines as described herein can include the barrier layer formed of the polyarylene sulfide composition as the innermost layer, in those embodiments in which the flowline specifications do not call for an inner carcass layer as the riser described above.

The diameters of flowlines can also vary widely as is known in the art. For instance, a production fluid riser can generally have a relatively large inner diameter, from about 5 centimeters (about 2 inches) up to about 60 centimeters (about 24 inches) or even greater in some embodiments, while flowlines that carry supporting fluids to or from the well head, the manifold, the storage facility, etc., can be larger or smaller than the production fluid flowlines. For instance, an injection fluid flowline can be smaller than a production fluid flowline, for example, between about 5 centimeters (2 inches) to about 15 centimeters (6 inches) in inner diameter.

A flowline design can vary over the length of the flowline. For instance, as the offshore flowlines reach greater depths, extend to greater offshore distances, and operate at higher pressures, the flowlines that supply supporting fluids to the wells, manifolds, etc. that directly or indirectly support the hydrocarbon product extraction can increase in complexity. Accordingly, the supporting fluids may be supplied to the equipment using flowlines that vary along their length from a flowline that is designed for, e.g., lower pressure operation to a flowline that includes additional reinforcement layers for use in a more extreme environment. As the working pressure of the system increases, the supply pressures and injection pressures also increase. This increase in supply pressure may require that the flowline assemblies also be reinforced and re-engineered around the higher pressures at those locations of the system. Thus, the flowlines may vary in design across the entire length of the line. In any case, at least a portion of the flowlines can include a barrier layer formed of the polyarylene sulfide composition.

Figure 9:
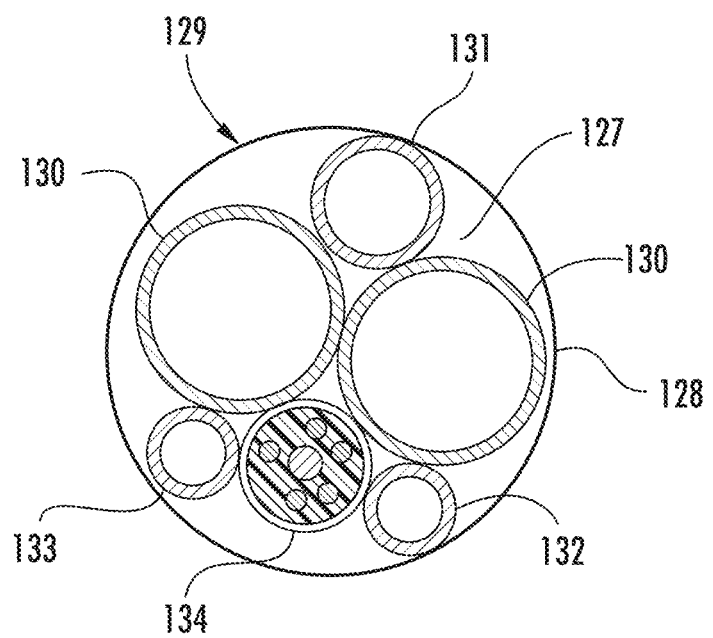
FIG. 9 illustrates a bundled riser including multiple flowlines as described herein.

Flowlines can also be bundled. By way of example, FIG. 9 illustrates a bundled riser 129. The outer casing 128 can be, e.g., a steel casing or a composite casing including multiple polymeric and/or metal layers. The bundled riser 129 includes two production fluid risers 130 that can carry hydrocarbon production fluid from the sea floor to a surface facility. The production fluid risers 130 can be multilayer risers as described above and including a barrier layer formed of the polyarylene sulfide composition. The bundled riser 129 also includes a hydraulic supply flowline 132 that supplies hydraulic fluid to the operating devices located upon the sea floor and an injection fluid flowline 133. The bundled riser 129 includes an annulus line 131, which communicates with the interspaces 127 within the bundled riser 129 and may be used to establish circulation through the production flowlines and the interspaces (or annulus). For instance, a lower end of the annulus line 131 may be connected to a port such as a side port for communication with the interspaces 127. One or more valves can be mounted between the lower end of the annulus line 131 and the interspaces 127 for controlling fluid flow between the annulus line 131 and the interspaces. The bundled riser 129 can also include a control cable 134 that can be used to control the operation of devices located upon any wellhead according to standard practice as is known to the art.

A bundled riser can include two production fluid risers 130 as illustrated in FIG. 9 or can alternatively carry a single production fluid riser or more than two production fluid risers. For instance, a bundled riser can include a plurality of production fluid risers arranged around a centrally extending conduit or tube all of which can be surrounded by external casing. For example, the production fluid risers can border on each other and form a ring and also bear against the inner side of the external casing and against the outer side of the inner conduit, which can improve stability of the bundled riser without affecting flexibility. The inner tube can carry additional flowlines, such as a hydraulic flowline, injection fluid flowline, etc. as described. In another embodiment, the inner tube can function as a buoyancy line to supply additional buoyancy to the riser. In yet another embodiment, additional flowlines may be located in the interspaces between the production fluid risers and external to the inner tube.

Figure 10A:
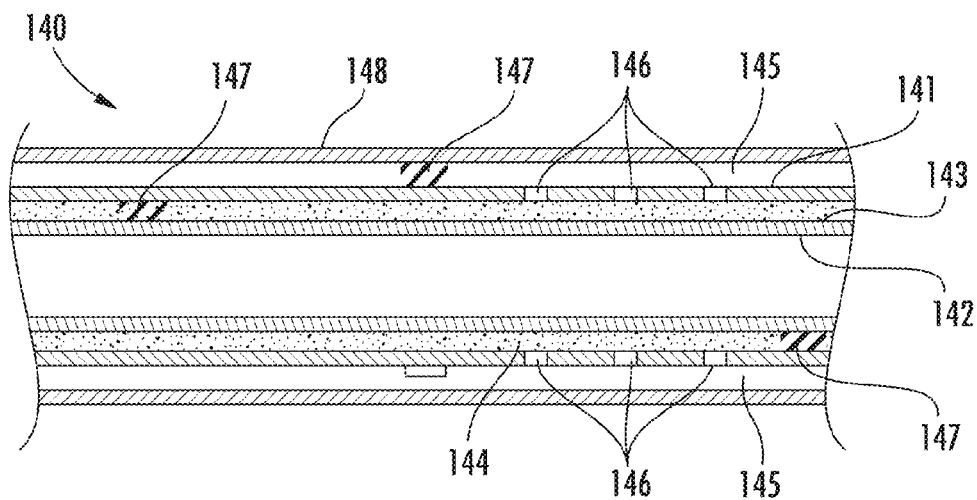
FIG. 10A is a side view and FIG. 10B is a cross-sectional view of a pipe-in-pipe flowline as may include one or more layers formed of the polyarylene sulfide composition.
Figure 10B:
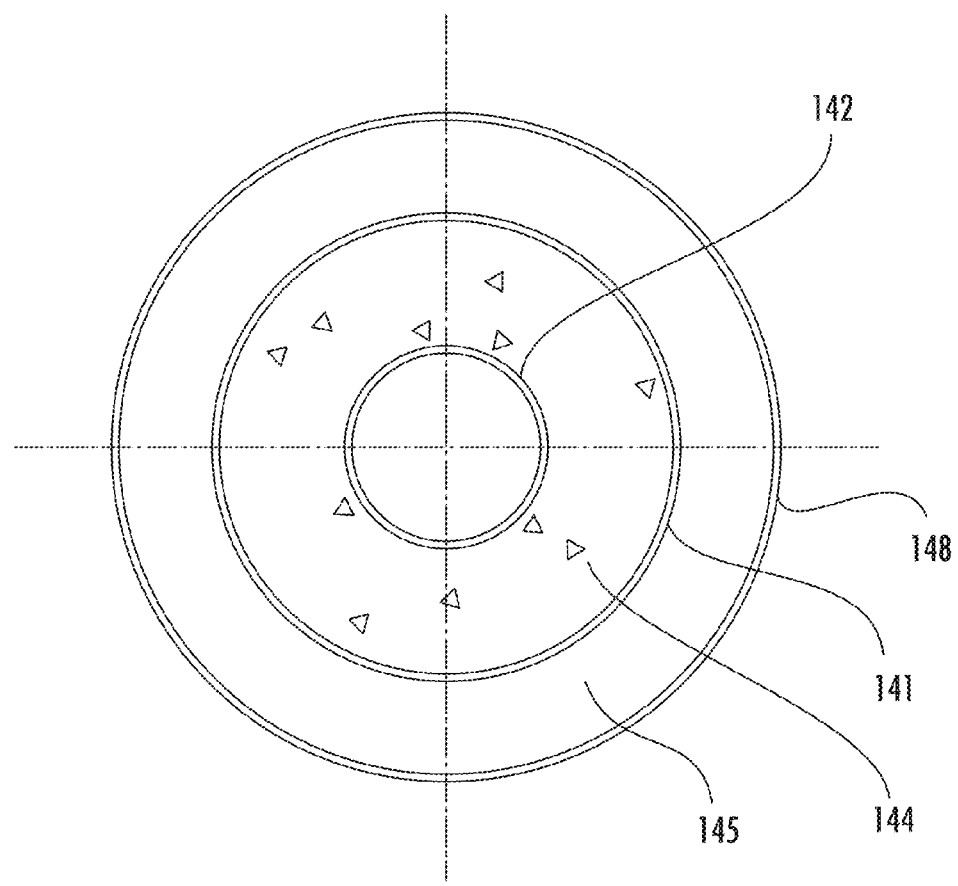

FIG. 10A and FIG. 10B illustrate a pipe-in-pipe arrangement 140 in a side view (FIG. 10A) and a cross sectional view (FIG. 10B) in which one or all of the walls of the lines 148, 141, and 142 can include a barrier layer formed of the polyarylene sulfide composition. In this particular embodiment, the pipe-in-pipe flowline is an insulated flowline that includes an inner production fluid flowline 142 encased in an external casing 148. The inner production fluid flowline 142 is also encased in a jacket 141. In this particular embodiment, the annulus 143 between the inner production fluid flowline 142 and the jacket 141 is filled with an insulation material 144, such as an open celled foam as is known in the art. The space 145 external to the jacket 141 and inside the external casing 140 can carry a supporting fluid, such as water, methanol, etc. or can be filled with a high pressure gas, which can further improve the insulative properties of the pipe-in-pipe flowline, for instance by providing access points 146 from the space 145 that carries the high pressure gas to the insulation material 144. The pipe-in-pipe arrangement can also include spacers 147 to maintain the desired distances between the production fluid flowline 142, the jacket 142, and the external casing 148. Other combination flowlines such as piggy-back flowlines are also encompassed herein.

The polyarylene sulfide composition may be utilized in forming all manner of components as may be incorporated in a fluid handling system in addition to pipes and hoses such as, without limitation, flanges, valves, valve seats, seals, sensor housings, thermostats, thermostat housings, diverters, linings, propellers, and so forth. In one embodiment, the polyarylene sulfide composition may be utilized in automotive applications, for instance in hoses, belts, etc. that may be subject to extreme temperatures as well as large temperature fluctuations during use.

The polyarylene sulfide composition may be used to form single- or multilayered containers including bags, bottles, storage tanks and other containers such as may be produced by extrusion, extrusion blow molding, injection blow molding, stretch blow molding, or other conventional processes for forming such articles.

The polyarylene sulfide composition can also be beneficially utilized in forming films, fibers and fibrous products. For example, extrusion processes as are known in the art can be utilized in forming films or fibers of the polyarylene sulfide composition.

Figure 11:
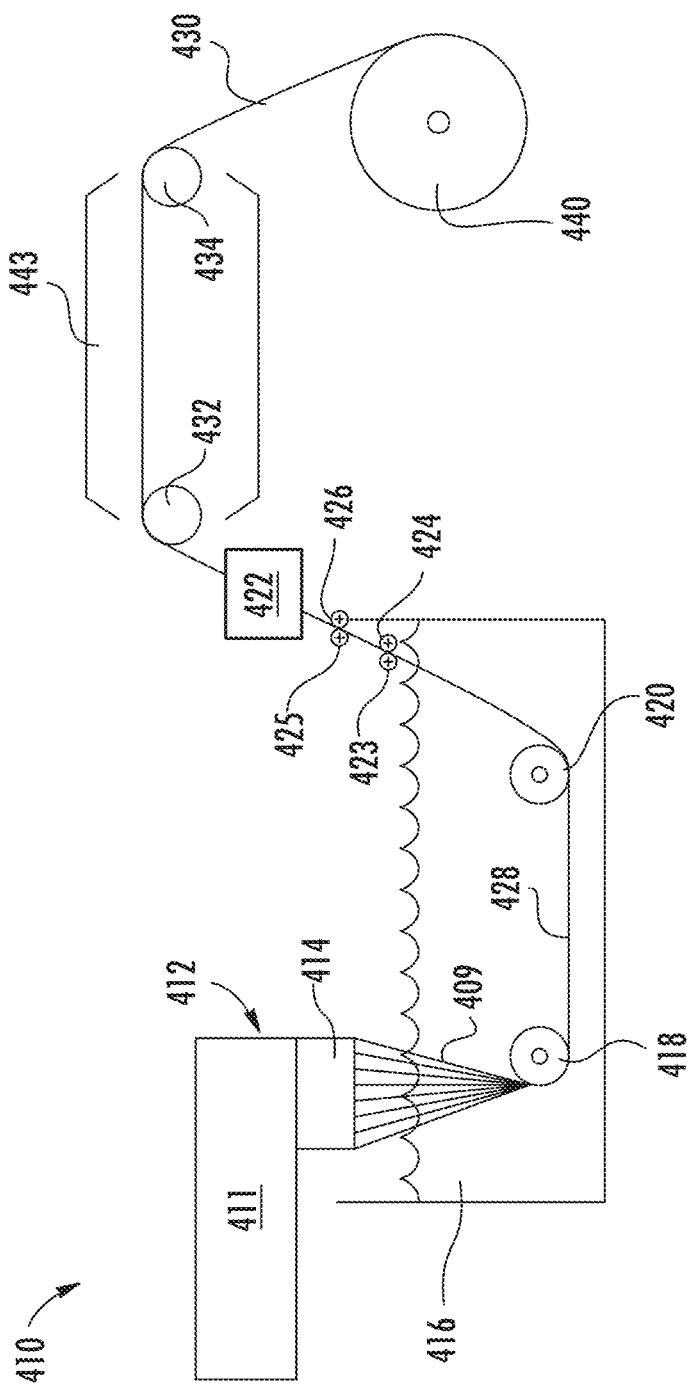
FIG. 11 illustrates a drawn fiber formation method as may be used in forming fibers of the polyarylene sulfide composition.

Fibers can include, without limitation, staple, continuous, multifilament, or monofilament fibers as may be formed using conventional melt spinning equipment. By way of example, FIG. 11 illustrates a process and system 410 by which a drawn fiber may be formed of the polyarylene sulfide composition. According to the illustrated embodiment, the previously formed polyarylene sulfide composition, for instance in the form of pellets or chips, can be provided to an extruder apparatus 412. The extruder apparatus 412 can include a mixing manifold 411 in which the polyarylene composition can be heated to form a molten composition and optionally mixed with any additional additives. If desired, to help ensure the fluid state of the molten mixture, the molten mixture can be filtered prior to extrusion. For example, the molten mixture can be filtered to remove any fine particles from the mixture by use of a filter with about 325 mesh or finer.

Following formation of the molten mixture, the mixture can be conveyed under pressure to the spinneret 414 of the extruder apparatus 412, where it can be extruded through multiple spinneret orifices to form one or more fibers or filaments 409. Extrusion temperatures in the range of about 280° C. to about 340° C. can be employed, for instance in the range of about 290° C. to about 320° C. Following extrusion of the polyarylene sulfide composition to form the fibers or filaments, the undrawn fibers or filaments 409 can be quenched in a liquid bath 416 and collected by a take-up roll 418, for instance to form a multifilament fiber structure or fiber bundle 428. Take-up roll 418 and roll 420 can be within bath 416 and convey individual fibers or filaments 409 and the gathered fiber bundle 428 through the bath 416. Dwell time of the material in the bath 416 can vary, depending upon line speed, bath temperature, fiber size, etc. Following exit from the quenching bath, the fiber bundle 428 can pass through a series of nip rolls 423, 424, 425, 426 to remove excess liquid from the fiber bundle 428. Optionally, a lubricant can be applied to the fiber bundle 428. For example, a spin finish can be applied at a spin finish applicator chest 422. Following, the polyarylene sulfide fiber bundle can be drawn at temperatures in the range of 90° C. to 110° C. using conventional equipment having a draw zone designed to heat the fiber to the appropriate temperature. For example, in the embodiment illustrated in FIG. 11, the fiber bundle 428 can be drawn in an oven 443. Additionally, in this embodiment, the draw rolls 432, 434 can be either interior or exterior to the oven 443, as is generally known in the art. Subsequent to drawing the fiber bundle 428 a hot roll 440 or heated zone in a temperature range of 100° C. to about 200° C. can be used to at least partially crystallize the formed polyarylene sulfide fiber 430.

Figure 12:
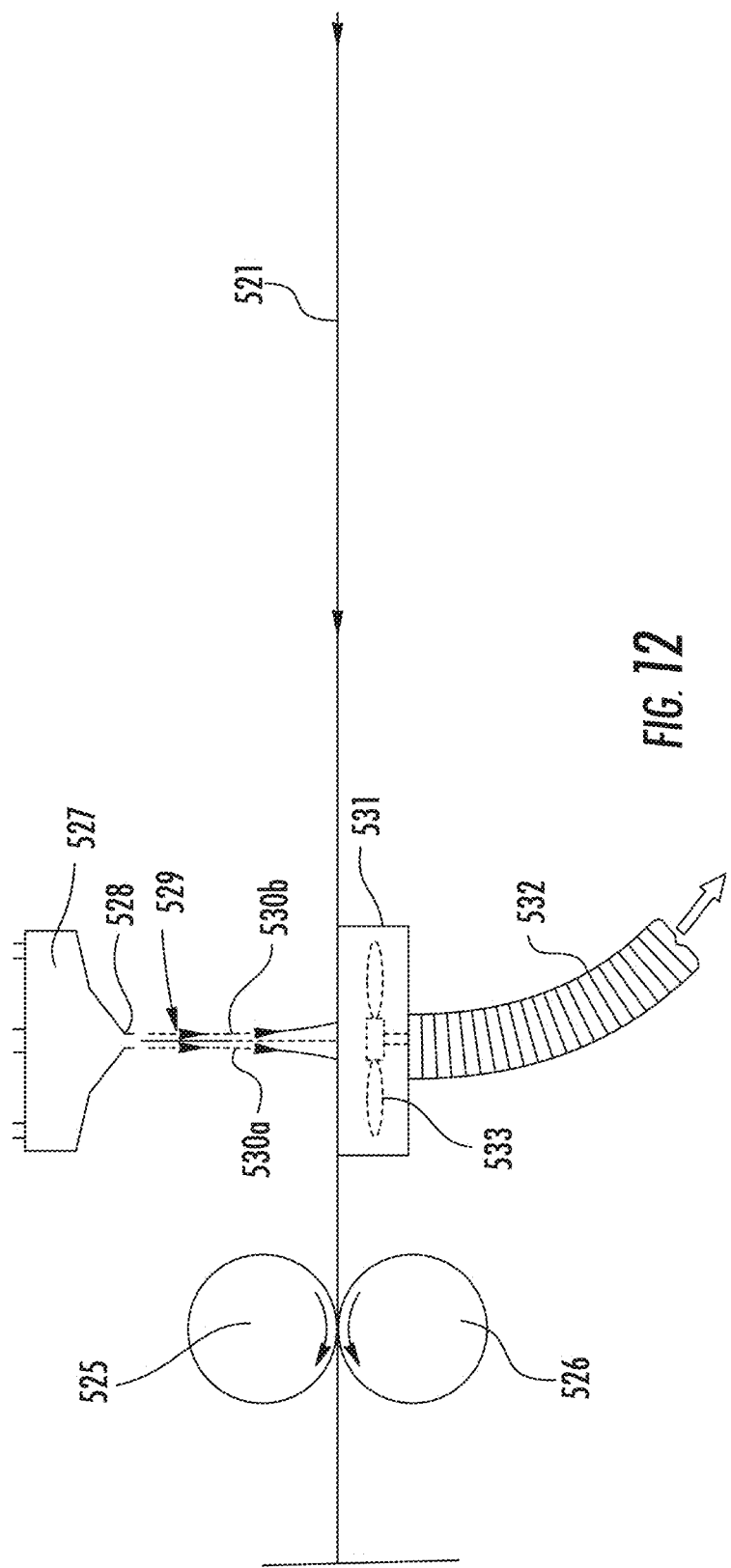
FIG. 12 illustrates a formation method for forming meltblown fibers of the polyarylene sulfide composition.

According to another embodiment, melt-blown fibers can be formed of the polyarylene sulfide composition. FIG. 12 illustrates one embodiment of a melt-blowing process as may be utilized. The melt-blowing process includes extruding the polyarylene sulfide composition from an extruder 527 through a linear array of single-extrusion orifices 528 directly into a high velocity heated air stream defined generally between 530*a* and 530*b*. The rapidly moving hot air greatly attenuates the fibers 529 as they leave the orifices 528. The die tip is designed in such a way that the holes are in a straight line with high velocity air impinging from each side 530*a*, 530*b*. A typical die will have 10-20 mil (0.25-0.51 mm) diameter holes spaced at 20 to 50 per inch. The impinging high-velocity hot air attenuates the filaments and forms the desired microfibers. Typical air conditions range from about 200° C. to about 370° C. Immediately around the die, a large amount of ambient air is drawn into the hot air stream containing the fibers. The ambient air cools the hot gas and solidifies the fibers.

The discontinuous fibers may be deposited on a conveyor or takeup screen 521 fed through rolls 525, 526 to form a random, entangled web. The fibers can be directed to the conveyor 521 by use of a suction device 531 that utilizes, e.g., a fan 533 that draws air away via tubing 532. Under the proper conditions, the fibers can still be somewhat soft at laydown and will tend to form fiber-fiber bonds—that is, they will stick together. The combination of fiber entanglement and fiber-to-fiber cohesion generally produces enough entanglement so that the web can be handled without further bonding. The web may also be deposited onto a conventional spun but not bonded web to which the former is then thermally bonded.

Figure 13:
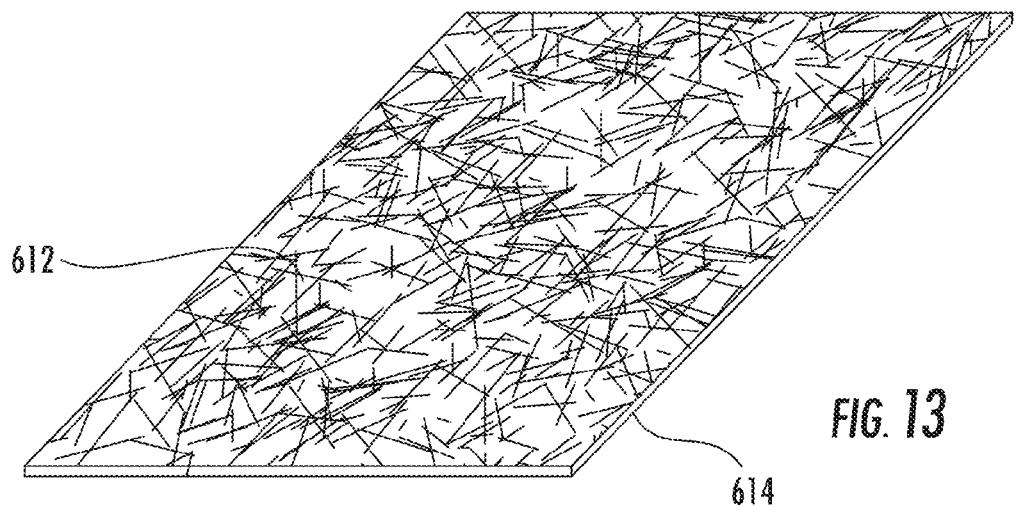
FIG. 13 illustrates a fibrous mat as may incorporate polyarylene sulfide fibers as described herein.

Fibers formed of the polyarylene sulfide composition can be utilized in a variety of fibrous substrates for a variety of applications including, without limitation, as battery separators, oil absorbers, filter media, hospital-medical products, insulation batting, and the like. By way of example, FIG. 13 illustrates a fibrous mat 612 comprising a plurality of polyarylene sulfide melt-blown fibers 614 as may be used to capture fine particles from a gas or liquid stream. For instance, a filter including fibers formed of the polyarylene sulfide composition can be utilized in filtering fuel, oil, exhaust, other fluids in an engine, e.g., an automotive engine, or in forming a filter bag, for instance as may be utilized with an industrial smokestack. Fibers formed of the polyarylene sulfide composition can also be utilized in forming insulation materials, such as insulative paper or fabrics in electrical components.

Figure 14A:
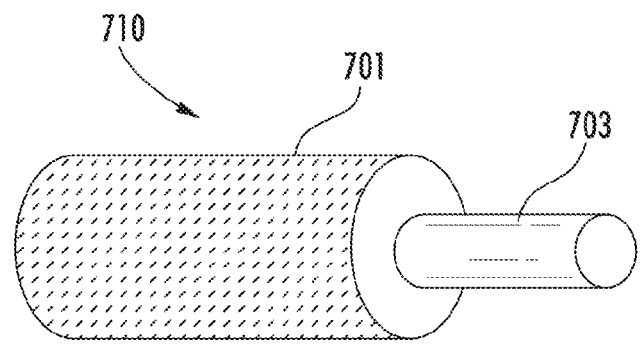
FIG. 14 illustrates a sheathed wire (FIG. 14A) and a sheathed cable (FIG. 14B) as may include the polyarylene sulfide composition.
Figure 14B:
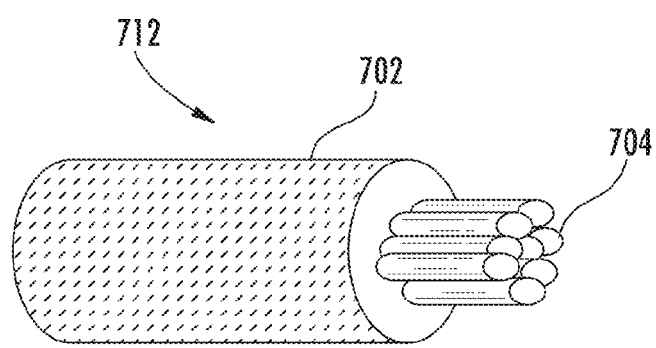

Still further, the composition may be employed in completely different environments, such as an electronic component such as a wire, a cable, or an umbilical. For example, and as illustrated in FIGS. 14A and 14B, the polyarylene sulfide composition can be utilized to form sheathing 701 around a wire 703 or sheathing 702 around a cable 704 for protection and encasement purposes. For instance, the polyarylene sulfide composition can be extruded by use of a sheathing machine around a wire or cable to form the protecting coating on the external surface of the wire/cable.

Figure 15:
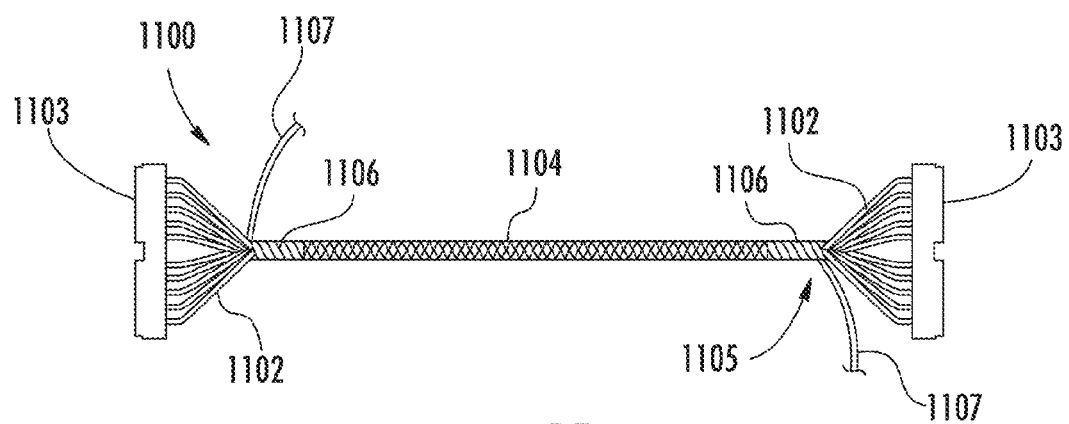
FIG. 15 illustrates a cable harness as may include the polyarylene sulfide composition.

In another embodiment the polyarylene sulfide composition can be used in forming devices for use in conjunction with cables, such as a cable harness or a cable wrap (also commonly referred to as a tie wrap). For example, one or more portions of a cable harness as may be utilized in a vehicle or other types of machinery can be formed from the polyarylene sulfide composition. For example, FIG. 15 illustrates a cable harness as may incorporate the polyarylene sulfide composition. Referring to FIG. 15 a cable harness 1100 includes a wire group 1102 formed of a plurality electric wires. Connector terminals 1103 are at both ends of the wire group 1102. A braid sleeve 1104 is provided around an outer periphery of the wire group 1102.

The braid sleeve 1104 can be formed by braiding a plurality of metallized fibers that can be formed by plating a fiber formed of the polyarylene sulfide composition with a metal such as, e.g., aluminum, copper, or alloy thereof. The braid sleeve 1104 can be wrapped by an adhesive tape 1106 at the ends and fixed to the wire group 1102, so as to prevent the braid sleeve 4 from raveling. At each end 1106 of the braid sleeve 1104, an extension 1107 of the metallized fiber used to form the braid sleeve 1104 can be included. The extensions 1107 can allow grounding of the cable harness. The cable harness also includes ground connecting parts 1105, in which both ends of the braid sleeve 1104 and both ends of an outer conductor in the wire group 1102 are electrically connected in parallel. Of course, any cable harness as is generally known in the art may incorporate the polyarylene sulfide composition.

The polyarylene sulfide composition can be utilized to form a variety of electronic components that may employ a molded part such as, for instance, cellular telephones, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), etc.

In one embodiment, the polyarylene sulfide composition can be used to form components for vehicles. For instance, the polyarylene sulfide composition can be used to form components for heavy trucks (i.e., vehicles having a gross vehicle weight range of over about 9000 kg (about 19,800 pounds)). Heavy trucks face unique operating conditions due to the nature of both the vehicles themselves as well as the nature of the use of the vehicles. For instance, the engines must often operate at high temperatures, particularly when carrying a load, and the vehicles will often encounter large mechanical stress and environmental assaults during use. The excellent strength and flexibility characteristics of the polyarylene sulfide can provide heavy truck components that are better able to withstand the operating conditions of these vehicles. Heavy duty trucks can include trucks having two, three, four, or more axles and can include both tractors and trailers that may be pulled by tractors. By way of example, contractor's trucks, delivery trucks, dump trucks, panel trucks, mix-in-transit trucks, truck tractors, and so forth can include components formed of the polyarylene sulfide composition.

Figure 16A:
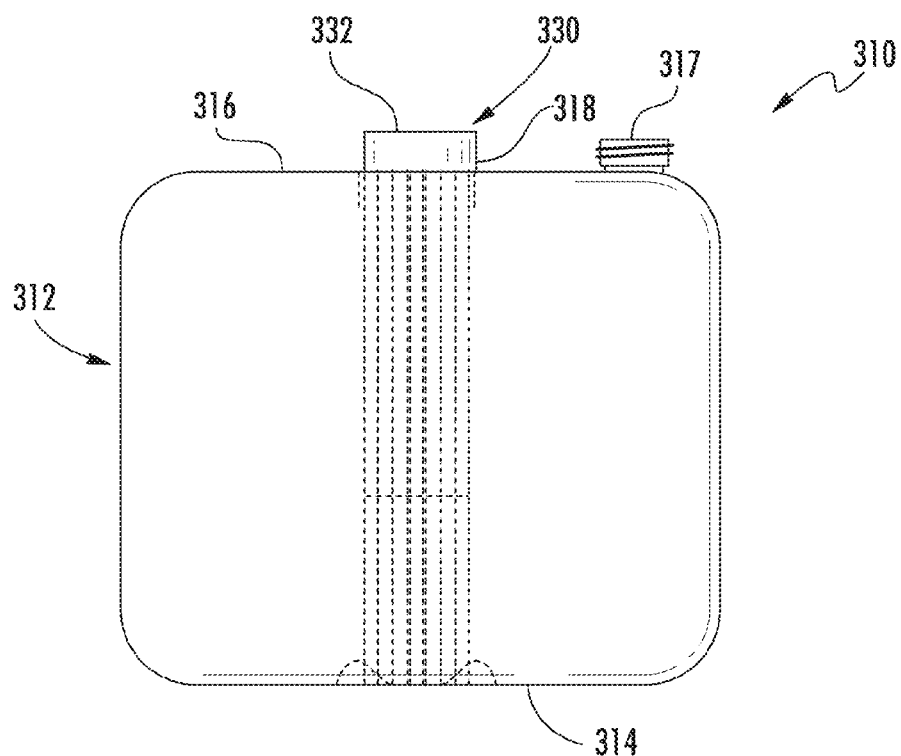
FIG. 16A and FIG. 16B illustrate a urea tank for a heavy duty truck as may incorporate components including the polyarylene sulfide composition.
Figure 16B:
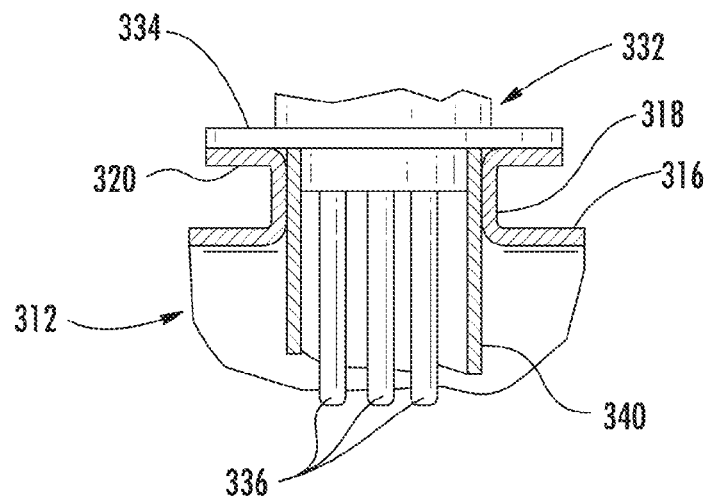

Heavy truck components as may be formed of the polyarylene sulfide composition can include, without limitation, hoses, belts, fuel lines, cooling system components, brake components, couplings, etc. For example, the polyarylene sulfide composition can be beneficially utilized in urea tanks of heavy duty trucks. FIGS. 16A and 16B schematically depict a urea tank 310 that includes a container 312 with a bottom wall 314 and a top wall 316. In the top wall 316 there is an opening 318 for the accommodation of a set of fittings 330. The container 312 further comprises a filling opening 317. The set of fittings 330 comprises a head 332 arranged to be connected fluid-tightly to the opening 318 in the top wall 316. This may be achieved in many different ways, e.g. by a flange connection between a radial flange 320 (FIG. 16B) of the opening 318 and a radial flange 334 of the head 332. The head 332 may also take the form of a screw cap with internal or external threads adapted to engage with complementary threads (not depicted) of the opening 318. A multiplicity of fittings 336 extend from the head 332 into the container 312. The fittings 336 may include a suction pipe for urea/water solution, a return pipe for unconsumed solution, a heating coil for thawing the solution when the latter is frozen by low ambient temperature, and a level sensor for the solution in the container. Beneficially, one or more of the suction pipe, the return pipe and the heating coil and/or a protective cover 340 may be formed of the polyarylene sulfide composition.

The excellent strength characteristics of the polyarylene sulfide composition can protect the components of the fittings 336 from harmful mechanical effects due to icing in the container 312, and the flexibility of the polyarylene sulfide composition allows the fittings 336 to sustain affects from movements of ice in the container 312.

Figure 17:
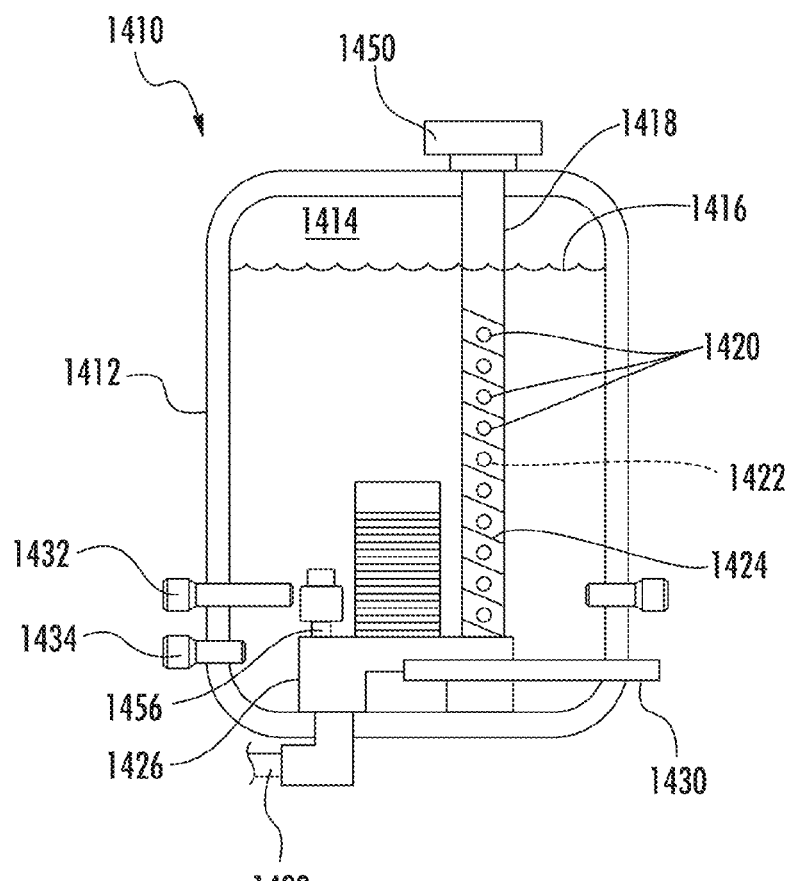
FIG. 17 illustrates another embodiment of a urea tank for a heavy duty truck as may incorporate components including the polyarylene sulfide composition.

Another exemplary urea tank assembly 1410 is shown in FIG. 17. The urea tank assembly includes a reservoir 1412 having a cavity 1414 configured for receiving and holding a liquid, such as urea solution 1416. The assembly further includes a tubular member 1418 that can be formed of the polyarylene sulfide composition having a one or more, or plurality of, openings 1420 formed therethrough for providing fluid communication between a hollow portion 1422 of the hollow member and the cavity of the reservoir. The assembly further includes a heater 1424 located proximate to or formed by the hollow portion to heat the urea solution within and about the hollow member. The assembly also includes a pump 1426 for causing fluid from within the cavity 1414, and in some exemplary embodiments from within the hollow portion, to be pumped to an exhaust gas stream for dispensing therein.

In operation, the urea solution 1416 is pumped, injected or otherwise placed into the cavity 1414 through suitable urea input conduit 1428 or through other means such as a capped opening 1450. The urea solution is heated through heater 1424 and pumped through a urea outlet conduit 1430 through pump 1426. Optionally, pumping of the urea solution may be achieved through a fluid level switch 1432, 1456 and heating may be based upon temperature reading from a temperature sensor 1434. The urea solution travels along the urea outlet conduit to a port in fluid communication with an exhaust gas conduit from an engine. The port provides means, such as an injector, for delivery into an exhaust gas stream and more particularly upstream from an exhaust gas treatment device.

Heavy truck components as may be formed from the polyarylene sulfide composition are not limited to urea tanks. For instance, tubular members as described above can be designed for heavy truck use in a fluid transport system including a hose assembly or a fuel line assembly. For instance, a multi-layer tubular component can be formed that includes as an inner layer the polyarylene sulfide composition that can withstand the fluids and environmental conditions expected within the member. A barrier layer can be adjacent to the inner layer and may be formed of a material that can exhibit low permeability to materials to be carried by the tubular member, e.g., diesel fuel. For example, the barrier layer may be formed of a polyamide such as PA6, PA11, PA12, PA66, PA 610, PA46, etc., as well as blends of polymers.

A multi-layer tubular member can include a tie layer that can facilitate bonding between adjacent layers. A tie layer may include a rubber composition based on, e.g., epichlorohydrin rubber, nitrile rubber, butadiene rubber/poly(vinyl chloride) blends, hydrogenated nitrile rubber, thermoplastic elastomers, or the like. The tie layer could be an adhesive coating as discussed above.

A multi-layer tubular member for use in heavy truck applications may include a cover that can be made of one or more suitable flexible elastomeric or plastic materials designed to withstand the exterior environment encountered. For instance, the cover may be formed of a polyarylene sulfide composition that is the same or different as the polyarylene sulfide composition utilized in forming the inner tube. According to another embodiment, the outer cover can be based on a rubber formulation such as, without limitation, hydrogenated nitrile rubber, chlorosulfonated polyethylene, polychloroprene, epichlorohydrin rubber, ethylene/vinylacetate copolymers, polyacrylic rubber, ethylene alkene copolymer, butadiene rubber/poly(vinyl chloride) blends, chlorinated polyethylene, and the like, which may be formulated with other ingredients in accordance with known methods of rubber compounding. A reinforcement layer as well as additional intermediate layers as discussed above may also be present in a multilayer tubular member.

A tubular member including the polyarylene sulfide composition can exhibit excellent flexibility and heat resistance, which can be of benefit if forming a tubular member for the charge air system of a heavy duty truck. A heat resistant tubular member for use in the air handling system can include an inner layer that includes the polyarylene sulfide composition and an outer layer formed on an outer peripheral surface of the tubular inner layer that can include a flame retardant. For example, the outer layer can be formed by using a material containing non-halogen flame retardant.

A charge air system coupling can be formed of the polyarylene sulfide composition that can provide a connection between various charge components of the charge air system including, without limitation, at the compressor inlet and discharge, at the charge air cooler, and/or at the turbine inlet and discharge. The flexibility and strength of the polyarylene sulfide composition can provide for a charge air system coupling that can handle slight misalignments between components of the system as well as isolate vibration between ends of the coupling. In addition, the resistance characteristics of the polyarylene sulfide composition can improve the coupling with regard to ozone resistance and increase the life of the component.

The polyarylene sulfide composition may also be beneficially utilized in forming components of an exhaust system for venting exhaust from an exhaust manifold of a diesel engine. A typical exhaust system can include an exhaust line and all or a portion of the exhaust line can be formed of the polyarylene sulfide composition.

The air brake system of a heavy duty truck may also include components formed of the polyarylene sulfide composition. For example, a coiled air brake hose assembly can include a coiled hose that may be a single layer hose or a multi-layer hose as described above in which at least one layer includes the polyarylene sulfide composition.

Figure 18:
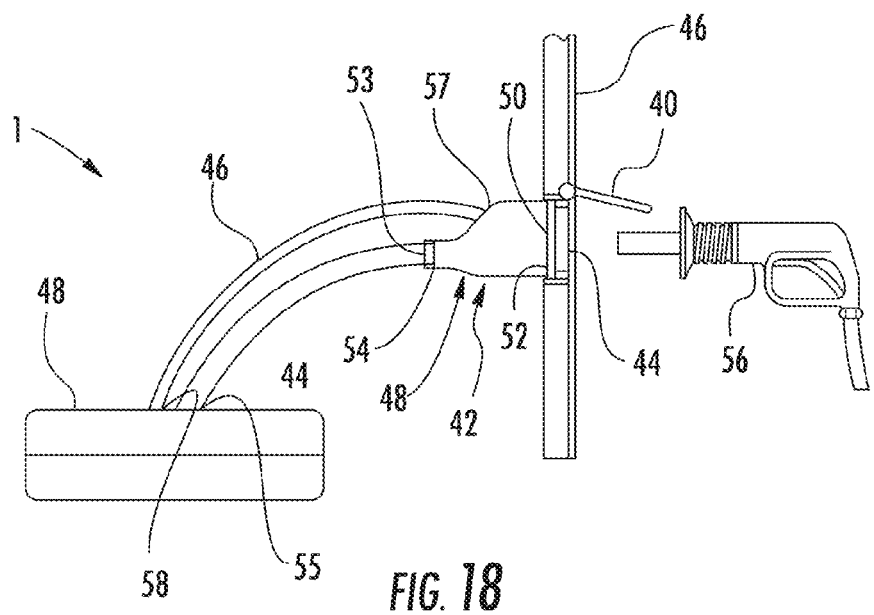
FIG. 18 illustrates a portion of a fuel system that can incorporate one or more fuel lines as may be formed from a polyarylene sulfide composition as described herein.

Components of other vehicles can be formed of the polyarylene sulfide composition, in addition to heavy duty trucks. For example, automotive fuel lines for use in cars or trucks of any size can be formed of the polyarylene sulfide composition. The polyarylene sulfide composition can be processed according to standard formation techniques to form a fuel line that can be either a single layer fuel tube or a multi-layer fuel hose. Fuel lines as encompassed herein are tubular shaped members having a hollow passage therethrough that allows passage of a fluid, a liquid, a gas, or a mixture thereof, through the fuel line. By way of example, FIG. 18 illustrates a portion of the fuel system that can include a fuel line that includes the polyarylene sulfide composition. FIG. 18 illustrates the intake portion generally 1 of a fuel system and includes a fuel filler neck 42, a filler tube 44, a fuel tank 48, a vent tube 46, and a gas cap 44, and is supported by an automobile body 46, which includes a movable cover 40 to conceal the gas cap 44. The filler neck 42 generally includes a funnel-shaped member 48. The filler neck 42 may receive a nozzle receptor 52, which is an insert adapted to receive a fuel nozzle 56 during fueling. The member 48 is defined at one end by an inlet opening 50 adapted to receive the gas cap 44, which screws directly into threads integrally formed in the member 48.

An opposite end of the member 48 is defined by an outlet opening 53, which is coupled to a first end 54 of a fuel line 44. The fuel line 44 can be a single layer tube or a multi-layer hose formed of the polyarylene sulfide composition. At a second end 55, the fuel line 44 is coupled to the fuel tank 48. The fuel tank system may also include a vent line 46 that connects to the member 48 at funnel vent opening 57 and to the fuel tank 48 at fuel tank opening 58. The vent line 46 allows displaced vapors in the fuel tank 48 to be vented during fueling. The vent line 46 may also be a single layer tube or a multi-layer hose that can be formed from the polyarylene sulfide composition.

Any fuel line that has a generally tubular shape and includes a hollow passage through the line (i.e., in the axial direction of the tubular member) as may be included in a vehicle engine, including both gasoline and diesel engines, may include one or more layers formed of the polyarylene sulfide composition, and it should be understood that the fuel lines are not in any way limited to the in-take portion of the fuel system as illustrated in FIG. 18. For example, fuel lines encompassed herein include fuel feed lines that carry fuel from the fuel tank to the engine and can be located downstream and/or upstream of the fuel filter. Other fuel lines as may incorporate the polyarylene sulfide composition can include, without limitation, fuel return lines, fuel bypass lines, fuel crossover lines, breather lines, evaporation lines, etc.

A fuel line in the form of a single layer tube can be utilized, for example, in forming a vent line 46 and/or a fuel line 44 as illustrated in FIG. 18. A single layer tube fuel line can generally have a wall thickness of less than about 3 millimeters, for instance from about 0.5 to about 2.5 millimeters, or from about 0.8 to about 2 millimeters. Single layer tube fuel lines can generally have a cross sectional diameter of less than about 10 millimeters, or less than about 5 millimeters in one embodiment. The length of a single layer tube fuel line can vary depending on the specific application and can be relatively long, for instance about 1 meter long or more, or can be short, for instance less than about 50 centimeters, or less than about 10 centimeters. Additionally, a single layer tube 50 can have a corrugated surface or a smooth surface.

A fuel line that incorporates the polyarylene sulfide composition can be a multi-layered tubular member that incorporates the polyarylene sulfide composition in one or more layers of the fuel line. Multi-layer fuel lines can include two, three, or more layers, as is known. Multi-layer fuel lines, similar to single layer fuel tubes, can be formed to have a wide variety of cross sectional and length dimensions, as is known in the art. In general, each layer of a multi-layer fuel line can have a wall thickness of less than about 2 millimeters, or less than about 1 millimeter; and the inner diameter of the multi-layer fuel line can generally be less than about 100 millimeters, less than about 50 millimeters, or less than about 30 millimeters.

The excellent barrier properties of the polyarylene sulfide composition combined with the chemical resistance properties of the polyarylene sulfide composition make it suitable for use in forming an inner layer of a multi-layer fuel line. However, the polyarylene sulfide composition is not limited to utilization as an inner layer of a multi-layer fuel line. The high strength characteristics of the polyarylene sulfide composition combined with the excellent barrier properties and good flexibility make the composition suitable for use in forming outer layers and/or intermediate layers of a multi-layer fuel line in addition to or alternative to forming the inner layer of the multi-layer fuel line.

Additional layers can be formed of a material that is the same or different than the polyarylene sulfide composition that forms the inner layer. For example, intermediate layers, outer layer, and adhesive layers of a fuel line can be formed of materials as described above for tubular members as may be formed of the polyarylene sulfide composition.

Vehicle components as may be formed from the polyarylene sulfide composition can include components that can be formed according to a blow molding process, such as those described above. By way of example, the fuel filler neck 42 and/or the gasoline tank 48 as illustrated in FIG. 18 can be formed from the polyarylene sulfide composition according to a blow molding process. Blow molded components such as a gasoline tank or other reservoirs (e.g., expansion tanks, fluid containers, etc.) can be single layer or multi-layered components. Components of the ventilation system such as air ducts can be formed of the polyarylene sulfide composition according to a blow molding process as can many other components including, without limitation, support structures, running boards, struts, grill guards, pillars, flooring, etc.

Figure 19:
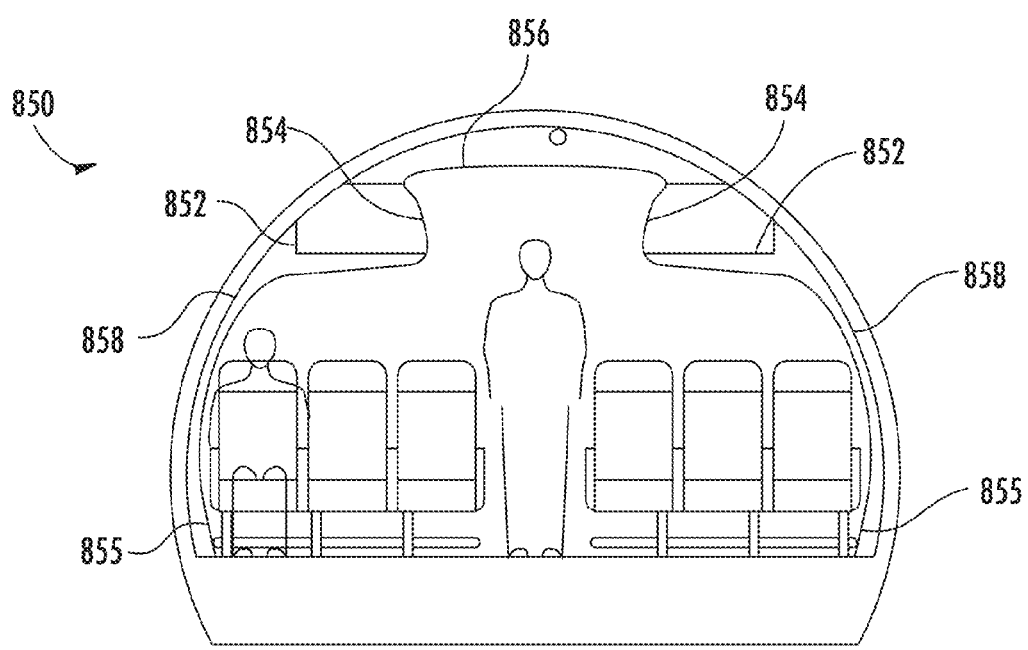
FIG. 19 is a schematic illustration of an airplane fuselage as may incorporate the polyarylene sulfide composition as described herein.

In another embodiment, the polyarylene sulfide composition may be utilized in aeronautical applications. By way of example, FIG. 19 illustrates one embodiment in which the polyarylene sulfide composition can be utilized in aircraft interior, for instance in forming panels within an aircraft interior. FIG. 19 schematically illustrates a cross-section through an aircraft fuselage 850 of the single aisle type, though the polyarylene sulfide composition may be beneficially utilized in forming aircraft of any size and shape. Panels as may be formed of the polyarylene sulfide composition can include, by way of example, and without limitation, the overhead racks or storage bins 852, the over-aisle head panels 854 that widen upwardly to an enlarged ceiling panel area, a ceiling panel 856, side wall panels 858, and lower wall panels 855. The number and size of the individual panels will generally vary from one aircraft to another. For example, a typical cross-section of the type of aircraft having fuselage 850 includes two storage bins, one ceiling panel, two side wall panels, and two lower wall panels. Variations of individual components are well known in the art. Of course, the polyarylene sulfide composition may be utilized in forming other components of an aircraft such as fuel lines as described above, components of the ventilation system as described, and so forth.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions.

Melt Viscosity: All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., -30° F., or -40° F. as reported below.

Unnotched Charpy Impact Strength: Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength: Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity: Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat Softening Temperature: Vicat Softening temperature was determined according to method A, with a load of 10 N and according to method B with a load of 50 N as described in ISO Test No. 306 (technically equivalent to ASTM D1525), both of which utilized a heating rate of 50 K/h.

Water absorption was determined according to ISO Test No. 62. The test specimens are immersed in distilled water at 23° C. until the water absorption essentially ceases (23° C./sat).

Complex viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 20:
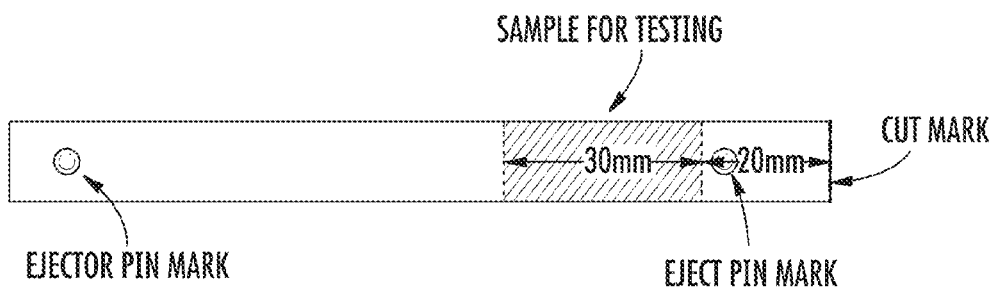
FIG. 20 illustrates the sample used in determination of melt strength and melt elongation of polyarylene sulfide compositions described herein.

Melt strength and melt elongation is performed on ARES-G2 equipped EVF fixture. The flame bar sample was cut as shown in FIG. 20. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance: The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat#9464K57, A75). A flat Viton® fluoroelastomer (Purchased from McMaster-Carr, cat#86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

Salt resistance: For testing resistance to zinc chloride, tensile bar samples were immersed in a 50% aqueous solution (by weight) of zinc chloride for 200 hours at 23±2° C. Following the samples were tested for Charpy notched impact strength as described at -30° C.

For testing resistance to calcium chloride, tensile bar samples were immersed in a 50% aqueous solution (by weight) of calcium chloride for 200 hours at 60±2° C. and held for an additional 200 hours out of solution at 60±2° C. Following, the samples were tested for Charpy notched impact strength as described at -30° C.

Hydrocarbon volume uptake: Absorption and diffusion testing was performed using the tab ends cut from supplied tensile bars. Each material was immersed in Brent crude oil, hydrocarbon/water mixture (and in a one-off test to hydrocarbon only). Rates and amounts of liquid absorbed were measured. The hydrocarbon liquid mixture had the following composition:

| Volume percent (%) | Composition |
|---|---|
| 10 | Distilled water |
| 60 | 70% heptane, 20% cyclohexane and 10% Toluene |
| balance | Nitrogen |

All exposure testing was conducted at 130° C. for a period of two weeks utilizing an air-circulating oven, air having been removed from the test vessel by purging with nitrogen; the test being conducted at vapor pressure.

Example 1

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Disulfide: 2,2-dithiodibenzoic acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 | — | 1.0 |
| Impact Modifier | main feed | 25.0 | 25.0 |

TABLE 1-continued

| Component | Addition Point | Sample 1 | Sample 2 |
|---|---|---|---|
| Polyarylene Sulfide | main feed | 74.7 | 73.7 |
| Total | | 100.0 | 100.0 |

Following formation, samples were tested for a variety of physical characteristics. Results are provided in Table 2, below.

TABLE 2

| | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

| | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

Example 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

| | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |

TABLE 4-continued

|  | Addition Point | 3 | 4 | 5 | 6 | 7 | 8 | 9 | 10 |
|---|---|---|---|---|---|---|---|---|---|
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total |  | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

TABLE 5

|  | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |
| Hydrocarbon volume uptake (%) | 16 |  |  |  |  |  |  |  |

Samples were annealed at 230° C. for 2 hours and re-tested for physical characteristics. Results are provided in Table 6, below.

TABLE 6

|  | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |

TABLE 6-continued

|  | Sample 3 | Sample 4 | Sample 5 | Sample 6 | Sample 7 | Sample 8 | Sample 9 | Sample 10 |
|---|---|---|---|---|---|---|---|---|
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

Figure 21:
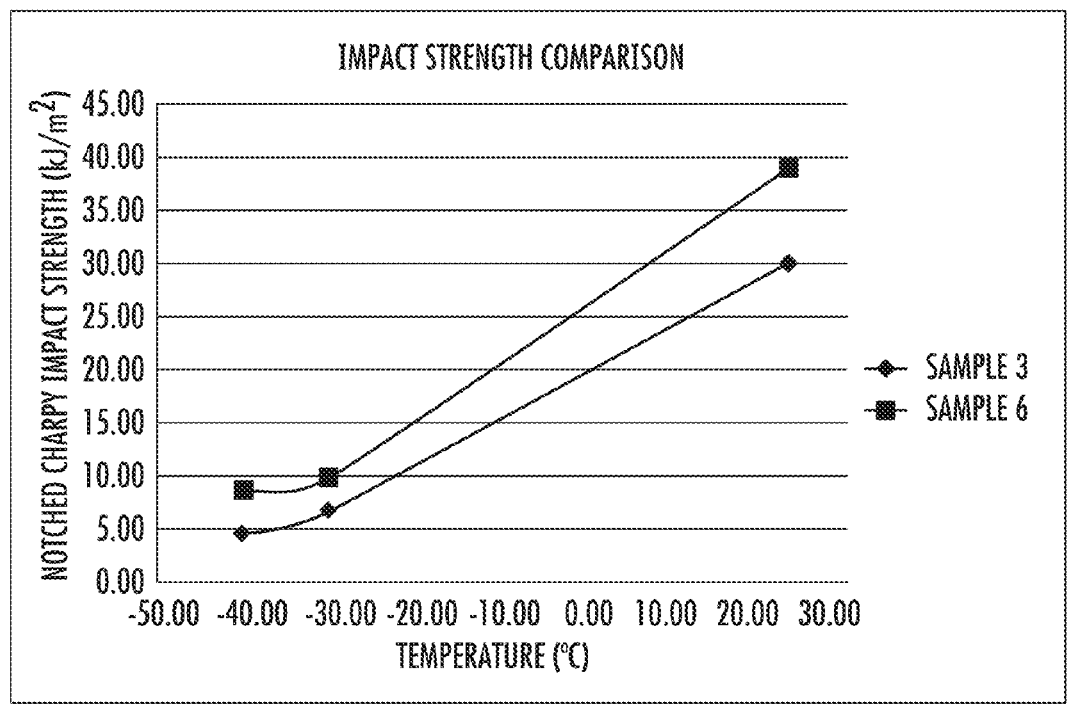
FIG. 21 illustrates the effect of temperature change on the notched Charpy impact strength of a polyarylene sulfide composition as described herein and that of a comparison composition.

FIG. 21 illustrates the relationship of notched Charpy impact strength over temperature change for Sample 3 and for Sample 6. As can be seen, the polyarylene sulfide composition of Sample 6 exhibits excellent characteristics over the entire course of the temperature change, with a higher rate of increase in impact strength with temperature change as compared to the comparison material.

FIG. 22 includes scanning electron microscopy images of the polyarylene sulfide used in forming the sample 3 composition (FIG. 22A) and the Sample 6 composition (FIG. 22B). As can be seen, there is no clear boundary between the polyarylene sulfide and the impact modifier in the composition of FIG. 22B.

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

|  | Sample 3 | Sample 6 | Sample 10 |
|---|---|---|---|
| Initial properties | | | |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. | | | |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. | | | |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |
| Charpy notched impact strength at 23° C. (kJ/m$^2$) | 9.2 | 31.0 | 34.0 |
| Loss in Charpy notched impact strength (%) | 59 | 21 | 15 |

The results in the change in Charpy notched impact strength over time during exposure to the acid solution at an elevated temperature are illustrated in FIG. 23. As can be seen, the relative loss of strength of samples 6 and 10 is much less than the comparison sample.

Example 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
|---|---|---|---|---|---|
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |
| Impact Modifier | main feed | 15.0 | 15.0 | 15.0 | 15.0 |
| Polyarylene Sulfide | main feed | 84.7 | 84.2 | 83.7 | 83.7 |
| Total |  | 100.0 | 100.0 | 100.0 | 100.0 |

Following formation, tensile bars formed of the samples were tested for a variety of physical characteristics. Results are provided in Table 9, below.

TABLE 9

|  | Sample 11 | Sample 12 | Sample 13 | Sample 14 |
|---|---|---|---|---|
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

Example 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
|---|---|---|---|---|---|
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total | | 100.0 | 100.0 | 100.0 | 100.0 |

Following formation, tensile bars formed of the samples were tested for a variety of physical characteristics. Results are provided in Table 11, below.

TABLE 11

| | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

Example 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total | | 100.0 | 100.0 | 100.0 | 100.0 | 100.0 |

Following formation, tensile bars formed of the samples were tested for a variety of physical characteristics. Results are provided in Table 13, below.

TABLE 13

| | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |
| Notched Izod Impact Strength at 23° C. (kJ/m$^2$) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

Example 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

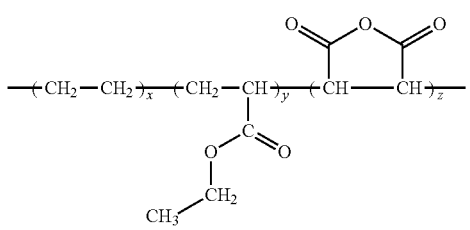

Crosslinking Agent: Hydroquinone

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |
| Notched Charpy Impact Strength at 23° C. (kJ/m$^2$) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m$^2$) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

Example 7

Materials utilized to form the compositions included the following:

Polyarylene Sulfide:

PPS1—Fortron® 0203 linear polyphenylene sulfide available from Ticona Engineering Polymers of Florence, Ky.

PPS2—Fortron®0205 linear polyphenylene sulfide available from Ticona Engineering Polymers of Florence, Ky.

PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 | | 1.0 | | 1.0 | | 1.0 |
| Impact Modifier | main feed | 15.0 | 15.0 | 15.0 | 15.0 | 15.0 | 15.0 |
| PPS1 | main feed | 84.7 | 83.7 | | | | |

TABLE 16-continued

| Component | Addition Point | Sample 29 | Sample 30 | Sample 31 | Sample 32 | Sample 33 | Sample 34 |
|---|---|---|---|---|---|---|---|
| PPS2 | main feed | | | 84.7 | 83.7 | | |
| PPS3 | main feed | | | | | 84.7 | 83.7 |
| Total | | 100.0 | 100.0 | 100.0 | 100.0 | 100.0 | 100.0 |

Following formation, samples were tested for a variety of physical characteristics. Results are provided in Table 17, below.

TABLE 17

| | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |

TABLE 17-continued

| | Sample 29 | Sample 30 | Sample 31 | Sample 32 | Sample 33 | Sample 34 |
|---|---|---|---|---|---|---|
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

Example 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |

TABLE 19-continued

|  | Sample 35 | Sample 36 | Sample 37 | Sample 38 | Sample 39 | Sample 40 |
|---|---|---|---|---|---|---|
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

Example 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |
| Polyarylene Sulfide | main feed | 83.7 | 78.6 | 73.45 | 68.45 |
| Total |  | 100.0 | 100.0 | 100.0 | 100.0 |

Following formation, samples were tested for a variety of physical characteristics. Results are provided in Table 21, below.

TABLE 21

|  | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |
| Hydrocarbon volume uptake (%) | 14 | 23 |  | 19 |

Figure 24:
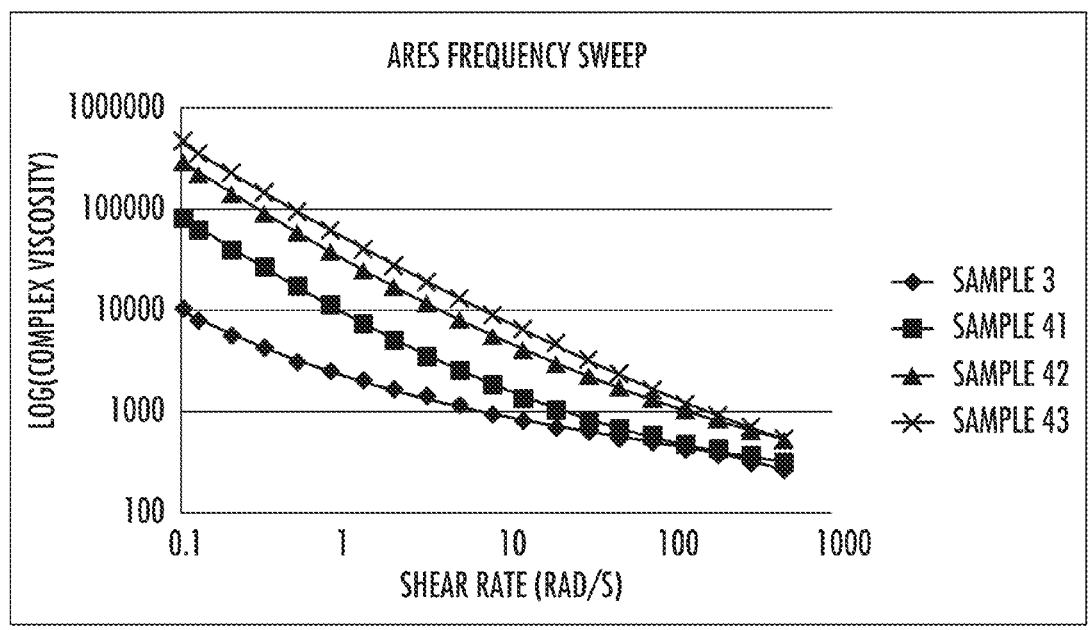
FIG. 24 provides the log of the complex viscosity obtained for polyarylene sulfide compositions described herein as a function of the shear rate.
Figure 25:
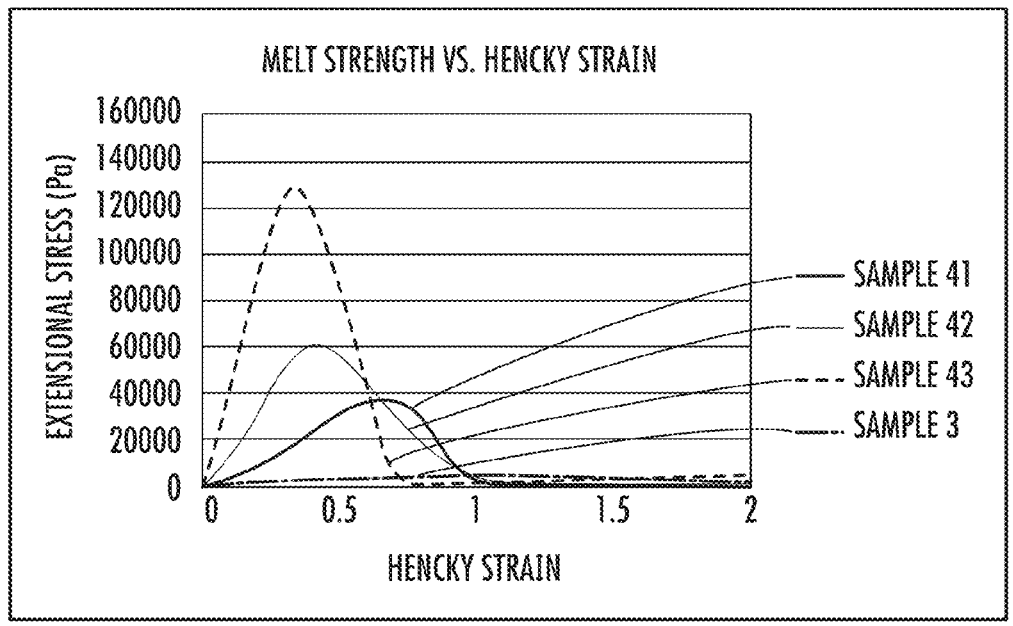
FIG. 25 provides the melt strength of polyarylene sulfide compositions described herein as a function of the Hencky strain.
Figure 26:
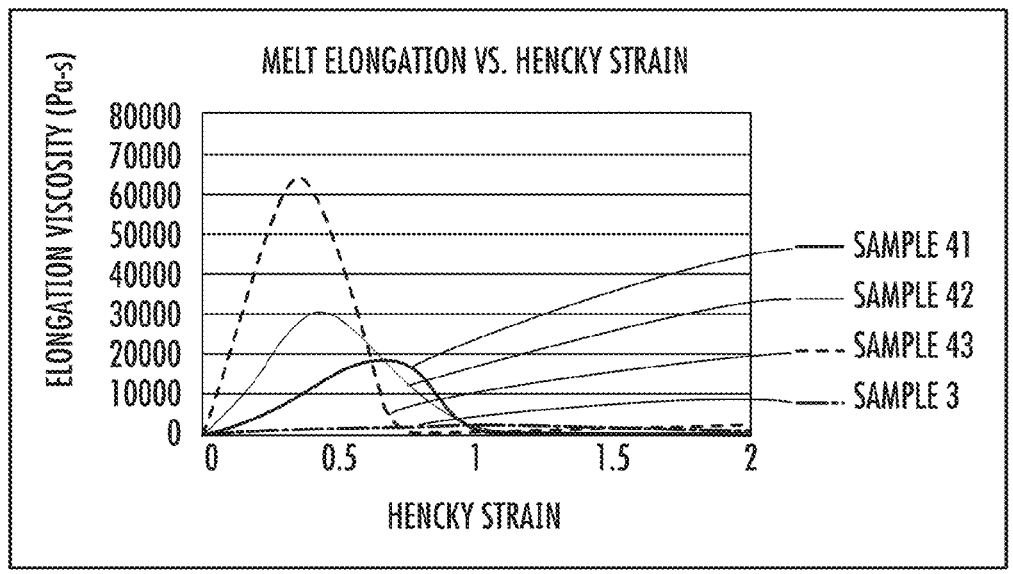
FIG. 26 provides the melt elongation for polyarylene sulfide compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 24, FIG. 25, and FIG. 26.

Example 10

Figure 27:
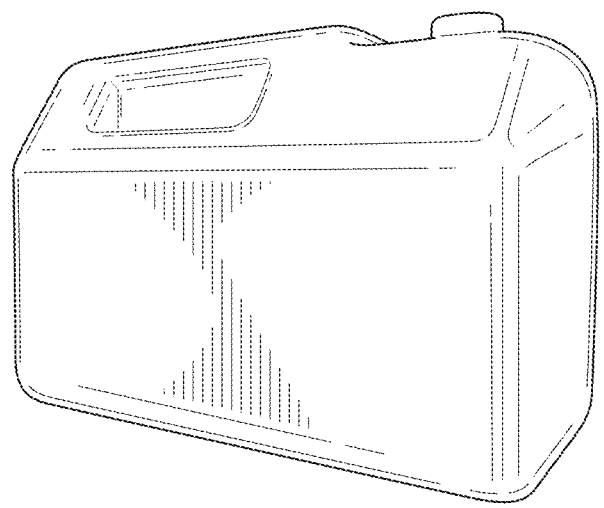
FIG. 27 illustrates a blow molded container formed of the polyarylene sulfide composition.
Figure 28A:
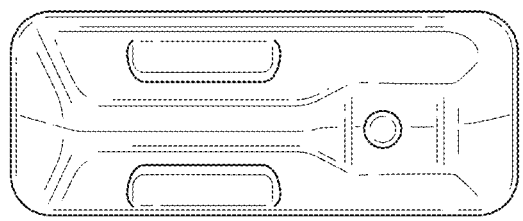
FIG. 28A and FIG. 28B are cross sectional images of the container shown in FIG. 27.
Figure 28B:

Sample 42 described in Example 9 was utilized to form a blow molded 1.6 gallon tank. The formed tank is illustrated in FIG. 27. Cross sectional views of the tank are presented in FIG. 28A and FIG. 28B. The formed tank has a good outer surface with regard to both visual inspection and feel. As shown in FIG. 28A, an even wall thickness (about 3 mm) was obtained and minimal sag was observed. As shown in FIG. 28B, the pinch-offs formed an excellent geometry.

Example 11

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m²) |
|---|---|---|
| CE10 | | |
| Aluminum blank-1 | 1.50 | 0.00418 |
| Aluminum blank-2 | 1.50 | 0.00418 |
| Sample No. 4-1 | 1.47 | 0.00418 |
| Sample No. 4-2 | 1.45 | 0.00418 |
| Sample No. 41-1 | 1.47 | 0.00418 |
| Sample No. 41-2 | 1.49 | 0.00418 |
| Sample No. 42-1 | 1.47 | 0.00418 |
| Sample No. 42-2 | 1.46 | 0.00418 |
| Sample No. 43-1 | 1.45 | 0.00418 |
| Sample No. 43-2 | 1.47 | 0.00418 |
| CM15A | | |
| Aluminum blank-1 | 1.50 | 0.00418 |
| Aluminum blank-2 | 1.50 | 0.00418 |
| Sample No. 4-1 | 1.48 | 0.00418 |
| Sample No. 4-2 | 1.49 | 0.00418 |
| Sample No. 41-1 | 1.49 | 0.00418 |
| Sample No. 41-2 | 1.50 | 0.00418 |
| Sample No. 42-1 | 1.47 | 0.00418 |
| Sample No. 42-2 | 1.48 | 0.00418 |
| Sample No. 43-1 | 1.46 | 0.00418 |
| Sample No. 43-2 | 1.47 | 0.00418 |
| Methanol | | |
| Aluminum blank-1 | 1.50 | 0.00418 |
| Aluminum blank-2 | 1.50 | 0.00418 |
| Sample No. 4-1 | 1.49 | 0.00418 |
| Sample No. 4-2 | 1.49 | 0.00418 |
| Sample No. 41-1 | 1.49 | 0.00418 |
| Sample No. 41-2 | 1.51 | 0.00418 |
| Sample No. 42-1 | 1.48 | 0.00418 |
| Sample No. 42-2 | 1.47 | 0.00418 |
| Sample No. 43-1 | 1.47 | 0.00418 |
| Sample No. 43-2 | 1.48 | 0.00418 |

Figure 29:
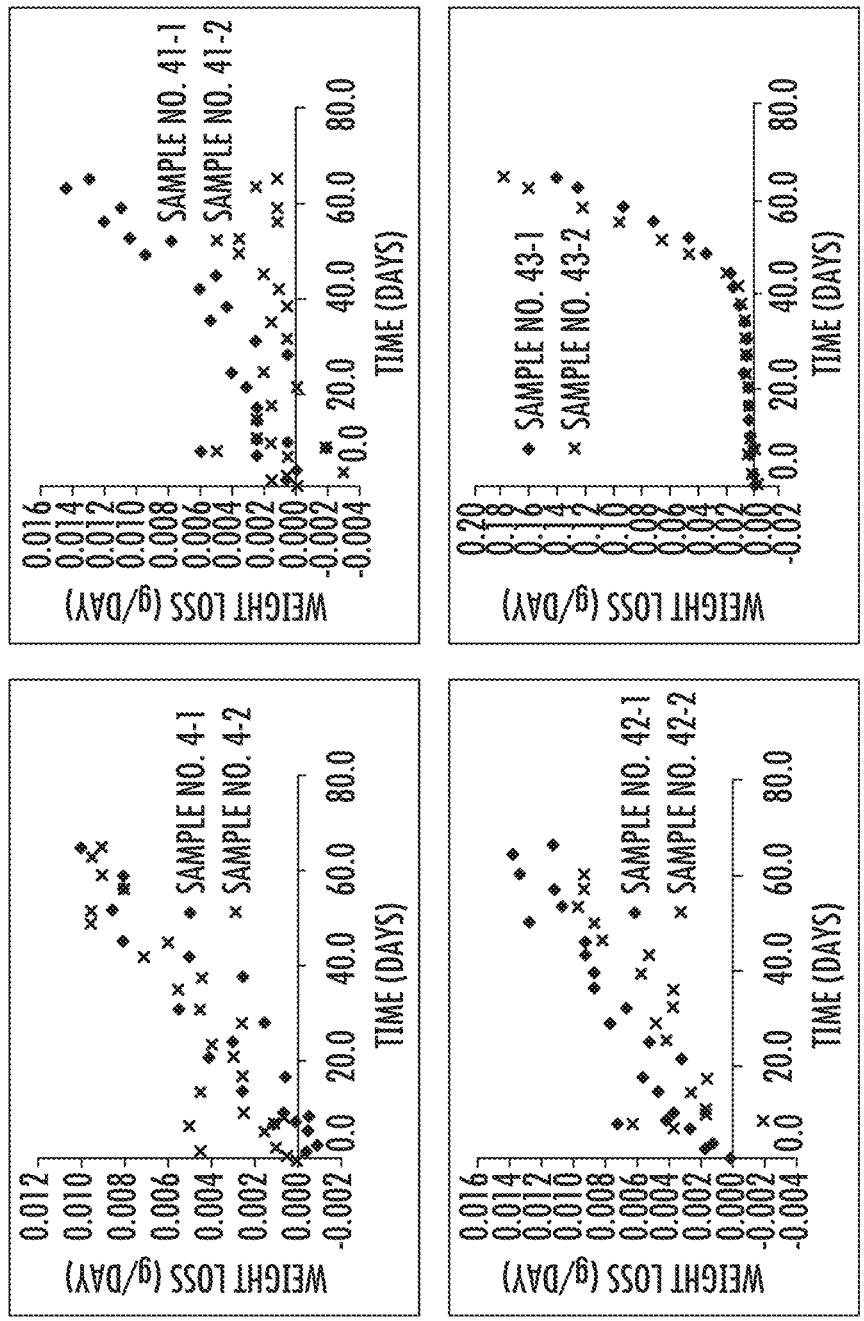
FIG. 29 illustrates the daily weight loss for testing samples in determination of permeation resistance of polyarylene sulfide compositions to CE10 fuel blend.
Figure 30:
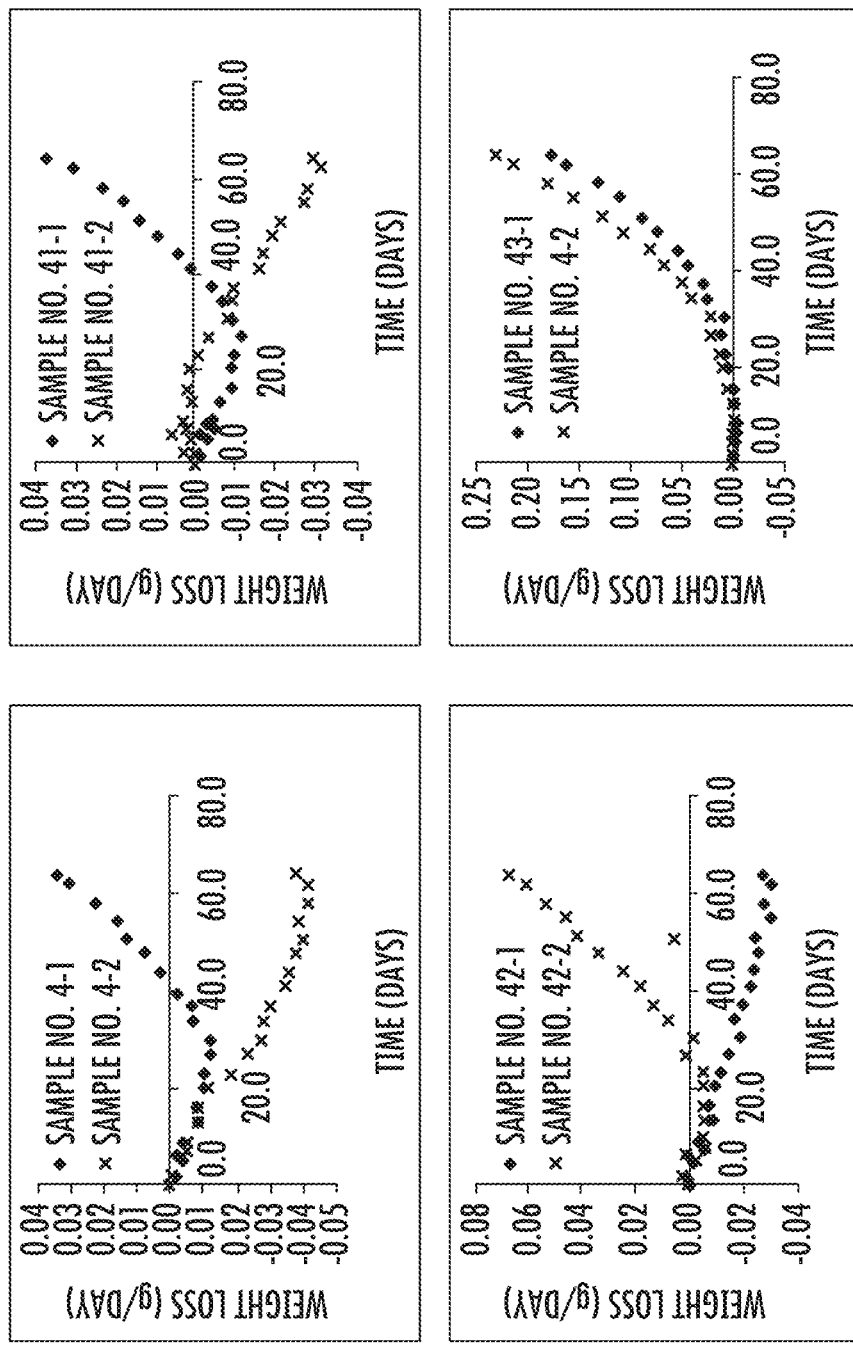
FIG. 30 illustrates the daily weight loss for testing samples in determination of permeation resistance of polyarylene sulfide compositions to CM15A fuel blend.
Figure 31:
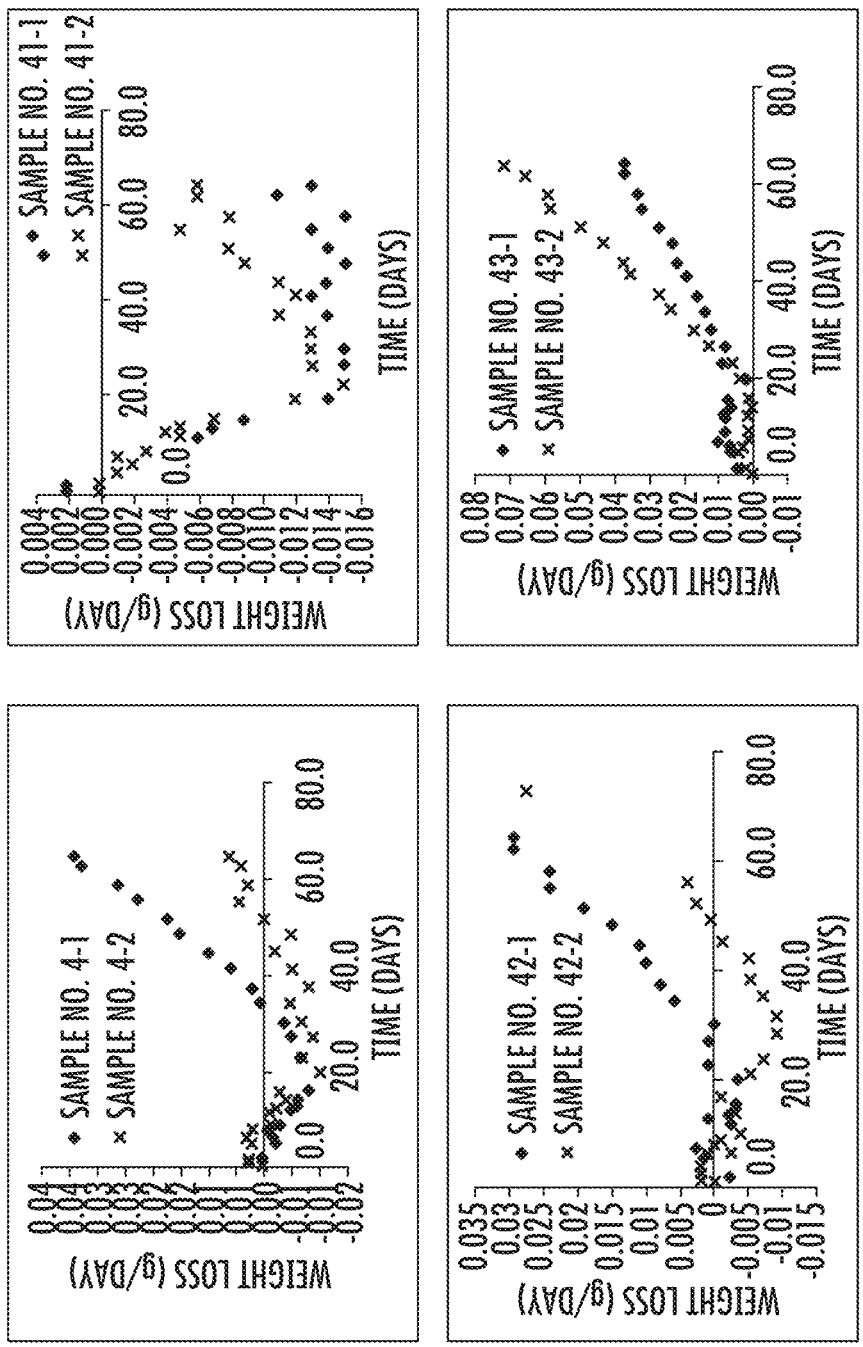
FIG. 31 illustrates the daily weight loss for testing samples in determination of permeation resistance of polyarylene sulfide compositions to methanol.

The daily weight losses for each material and each fuel are shown in FIGS. 29-31. Specifically, FIG. 29 shows the daily weight loss for the samples during the permeation test of CE10, FIG. 30 shows the daily weight loss for the samples during the permeation test of CM15A, and FIG. 31 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m²) | Average Normalized permeation (g-mm/day-m²) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |
| CM15A | | | | |
| Sample No. 4-1 | 0.49 | 0.18 ± 0.44 | 0.16 | 0.06 ± 0.15 |
| Sample No. 4-2 | −0.13 | | −0.04 | |
| Sample No. 41-1 | 0.50 | 0.11 ± 0.55 | 0.17 | 0.04 ± 0.18 |
| Sample No. 41-2 | −0.27 | | −0.09 | |
| Sample No. 42-1 | −0.13 | 0.27 ± 0.58 | −0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A polyarylene sulfide composition that is formed by melt processing (i) a linear polyarylene sulfide containing less than about 1 mol. % of cross-linking units based on the total monomer units of the polyarylene sulfide, (ii) from 20 wt. % to 35 wt. % of an epoxy-functionalized impact modifier, and (iii) from 1.0 wt % to 1.75 wt. % of a polyfunctional crosslinking agent that includes a dicarboxylic acid, wherein the crosslinking agent is supplied following distribution of the impact modifier with the polyarylene sulfide, and wherein the melt processing forms a crosslinked epoxy-functionalized impact modifier that is a reaction product of epoxy-functionalized monomer units and a polyfunctional crosslinking agent, and further wherein the polyarylene sulfide composition has a notched Charpy impact strength of greater than about 3 kJ/m² as measured according to ISO Test No. 179-1 at a temperature of 23° C. and a notched Charpy impact strength of greater than about 8 kJ/m² as measured according to ISO Test No. 179-1 at a temperature of −30° C., wherein the composition also exhibits a tensile elongation at break of about 70% or more as determined in accordance with ISO Test No. 527 at a temperature of 23° C. and at a speed of 50 mm/min.

2. The polyarylene sulfide composition according to claim 1, wherein the composition has an elongation at yield of greater than about 4.5% as determined according to ISO Test No. 527 at a temperature of 23° C. and a test speed of 5 mm/min.

3. The polyarylene sulfide composition according to claim 1, wherein the polyarylene sulfide is not functionalized.

4. The polyarylene sulfide composition according to claim 1, further comprising an additive that includes a filler, UV stabilizer, heat stabilizer, lubricant, colorant, or a combination thereof.

5. The polyarylene sulfide composition according to claim 1, wherein the polyarylene sulfide composition is free of plasticizers.

6. The polyarylene sulfide composition according to claim 1, wherein the polyarylene sulfide composition has a notched Charpy impact strength of greater than about 30 kJ/m² at a temperature of 23° C.

7. The polyarylene sulfide composition according to claim 1, wherein the polyarylene sulfide composition has a notched Charpy impact strength of greater than about 10 kJ/m² at a temperature of −30° C.

8. The polyarylene sulfide composition according to claim 1, wherein the composition has a ratio of the notched Charpy impact strength as determined according to ISO Test No. 179-1 at 23° C. to that at −30° C. greater than about 3.5.

9. The polyarylene sulfide composition according to claim 1, wherein the composition has a deflection temperature under load of greater than about 80° C. as measured according to ISO Test No. 75-2 at 1.8 MPa.

10. The polyarylene sulfide composition according to claim 1, wherein the composition has a loss in Charpy notched impact strength as determined according to ISO Test No. 179-1 at 23° C. of less than about 17% following exposure of about 500 hours to a 10 wt. % sulfuric acid solution at a temperature of about 40° C. and/or less than about 25% following exposure of about 500 hours to a 10 wt. % sulfuric acid solution at a temperature of about 80° C.

11. The polyarylene sulfide composition according to claim 1, wherein the composition has a halogen content of less than about 1000 ppm.

12. The polyarylene sulfide composition according to claim 1, wherein the composition meets the V-0 flammability standard at a thickness of 0.2 millimeters.

13. The polyarylene sulfide composition according to claim 1, wherein the composition has a tensile modulus of less than about 3000 MPa, tensile break stress of greater than about 30 MPa, and/or a tensile break strain greater than about 25%, as determined according to ISO Test No. 527 at a temperature of 23° C. and a test speed of 5 mm/min.

14. The polyarylene sulfide composition according to claim 1, wherein the epoxy-functionalized impact modifier includes methacrylic monomer units.

15. The polyarylene sulfide composition according to claim 14, the epoxy-functionalized impact modifier further includes α-olefin monomer units.

16. The polyarylene sulfide composition according to claim 1, wherein the dicarboxylic acid includes terephthalic acid.

17. The polyarylene sulfide composition according to claim 1, wherein the epoxy-functionalized monomer units include epoxy-functionalized methacrylic monomer units.

18. The polyarylene sulfide composition according to claim 1, wherein polyarylene sulfides constitute from about 20% wt. % to about 78.6 wt. % by weight of the composition.

19. The polyarylene sulfide composition according to claim 1, wherein the polyarylene sulfide is functionalized.

20. The polyarylene sulfide composition according to claim 19, wherein the functionalized polyarylene sulfide is a reaction product of a polyarylene sulfide and a disulfide compound having a reactive functionality.

* * * * *